US011683453B2

(12) United States Patent
Naphade et al.

(10) Patent No.: US 11,683,453 B2
(45) Date of Patent: Jun. 20, 2023

(54) OVERLAYING METADATA ON VIDEO STREAMS ON DEMAND FOR INTELLIGENT VIDEO ANALYSIS

(71) Applicant: NVIDIA Corporation, Santa Clara, CA (US)

(72) Inventors: Milind Naphade, Cupertino, CA (US); Parthasarathy Sriram, Los Altos, CA (US); Farzin Aghdasi, East Palo Alto, CA (US); Shuo Wang, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 16/991,770

(22) Filed: Aug. 12, 2020

(65) Prior Publication Data

US 2022/0053171 A1    Feb. 17, 2022

(51) Int. Cl.
*H04N 7/18*    (2006.01)
*G11B 27/30*    (2006.01)
(Continued)

(52) U.S. Cl.
CPC ............ *H04N 7/183* (2013.01); *G06V 20/46* (2022.01); *G11B 27/3081* (2013.01); *G11B 27/34* (2013.01); *G06V 2201/10* (2022.01)

(58) Field of Classification Search
CPC .... H04N 7/183; G11B 27/34; G11B 27/3081; G06K 9/00744; G06K 2209/27
(Continued)

(56) References Cited

U.S. PATENT DOCUMENTS 10,984,275 B1 *   4/2021  Campbell .............. G06V 20/46
2013/0128050 A1 * 5/2013  Aghdasi ................. G06T 7/292
                                                       348/158
(Continued)

OTHER PUBLICATIONS

Zhang et al., "The Design and Implementation of a Wireless Video Surveillance System", MobiCom '15: Proceedings of the 21st Annual International Conference on Mobile Computing and Networking, Sep. 2015, pp. 426-438, <https://doi.org/10.1145/2789168.2790123>.*

(Continued)

*Primary Examiner* — Thai Q Tran
*Assistant Examiner* — Stephen R Smith
(74) *Attorney, Agent, or Firm* — Taylor English Duma L.L.P.

(57) ABSTRACT

In various examples, cloud computing systems may store frames of video streams and metadata generated from the frames in separate data stores, with each type of data being indexed using shared timestamps. Thus, the frames of a video stream may be stored and/or processed and corresponding metadata of the frames may be stored and/or generated across any number of devices of the cloud computing system (e.g., edge and/or core devices) while being linked by the timestamps. A client device may provide a request or query to dynamically annotate the video stream using a particular subset of the metadata. In processing the request or query, the timestamps may be used to retrieve video data representing frames of the video stream and metadata extracted from those frames across the data stores. The retrieved metadata and video data may be used to annotate the frames for display on the client device.

20 Claims, 13 Drawing Sheets

(51) Int. Cl.
*G11B 27/34* (2006.01)
*G06V 20/40* (2022.01)

(58) Field of Classification Search
USPC ..................................... 348/143, 159; 726/3
See application file for complete search history.

(56) References Cited

U.S. PATENT DOCUMENTS

| | | | | |
|---|---|---|---|---|
| 2016/0292511 | A1* | 10/2016 | Ayalasomayajula | ......................... G06V 40/103 |
| 2017/0034483 | A1* | 2/2017 | Aghdasi | .................. G06F 16/78 |
| 2017/0294213 | A1* | 10/2017 | Brauckmann | .......... G11B 27/34 |
| 2019/0294889 | A1* | 9/2019 | Sriram | ................. G06V 20/584 |
| 2020/0029086 | A1* | 1/2020 | Zou | ...................... H04N 19/436 |
| 2020/0042557 | A1* | 2/2020 | Kudryavtsev | ......... G06F 16/387 |
| 2020/0082851 | A1* | 3/2020 | Chau | .................... G06V 40/161 |
| 2020/0090477 | A1* | 3/2020 | Monge Nunez | ... G06K 9/00536 |
| 2020/0134315 | A1* | 4/2020 | Trim | ..................... G06F 16/288 |
| 2020/0169717 | A1* | 5/2020 | Zavesky | .............. H04N 21/816 |
| 2021/0195089 | A1* | 6/2021 | Kojima | ............. H04N 5/23206 |
| 2021/0409792 | A1* | 12/2021 | Larrew | ........... H04N 21/23113 |

OTHER PUBLICATIONS

Wang et al.,"Elastic Urban Video Surveillance System Using Edge Computing", SmartIoT '17: Proceedings of the Workshop on Smart Internet of Things, Oct. 2017, Article No. 7, pp. 1-6, <https://doi.org/10.1145/3132479.3132490>.*

IPS Intelligent Video Analytics. "IPS AnalyticsManager V10.0—System Description." Securiton GmbH. Mar. 26, 2019. Munich, Germany. 7 Pages.

* cited by examiner

OVERLAYING METADATA ON VIDEO STREAMS ON DEMAND FOR INTELLIGENT VIDEO ANALYSIS

BACKGROUND

Intelligent Video Analytics (IVA) systems may be used to analyze video streams and provide results of the analysis in real-time. For example, an IVA system may assist a user in identifying and tracking specific objects such as people or vehicles that appear within the video stream. To do so, the IVA system may extract metadata from the video stream regarding the objects and annotate the video stream with corresponding visual indicators such as labels, bounding boxes, alerts and/or colors. When an IVA system is implemented using a distributed computing architecture with edge and cloud, a module that processes the video stream and generates the metadata may be followed by other modules that also generate additional metadata. In annotating frames of the video stream using this metadata, the annotations should match the frames that were analyzed to generate the metadata. A challenge arises in annotating the video stream, as the analysis may be spread across many devices which may not be in the same location, and a user may not be interested in viewing annotations for all of the metadata at once.

In order to address these challenges, conventional IVA systems generate multiple copies of a video stream with different annotations baked into the frames for each type of analytics engine that processes the source video data. When a user desires to view a particular type of annotation, the appropriate copy of the video stream may be provided to the user. These copies are stored pre-processed, pre-annotated, and pre-labeled, which can create significant storage demands to account for each variation of a video stream in which different annotations may be desired. Fewer annotated videos may be created by including more of the annotations in the same video, but this has the result of a visually cluttered image due to the number of visual indicators that may be included within the frames of the video. This has the effect of diminishing the usefulness of the annotated video.

SUMMARY

Embodiments of the present disclosure relate to overlaying metadata on video streams on demand for intelligent video analytics. Systems and methods are disclosed that may store video data of video streams and metadata of the video streams in separate data stores (e.g., on different cloud devices) with timestamps that associate frames of the video streams with corresponding portions of the metadata. In processing a request (e.g., from a client) to view a video stream that is annotated with metadata, the timestamps may be used to retrieve the related frames and metadata across the data stores, and the metadata may be overlaid on the frames for viewing.

In contrast to conventional systems, the disclosure provides for cloud computing systems that may store frames of video streams and metadata generated from the frames in separate data stores, with each type of data being indexed using shared timestamps. Thus, the frames of a video stream may be stored and/or processed and corresponding metadata of the frames may be stored and/or generated across any number of devices of the cloud computing system (e.g., edge and/or core devices) while being linked by the timestamps. A client device may provide a request or query to dynamically annotate the video stream (e.g., live video or historical video) using a particular subset of the metadata (e.g., indicated by one or more metadata attributes). In processing the request or query, the timestamps may be used to retrieve video data representing frames of the video stream and metadata extracted from those frames across the data stores. The retrieved metadata and video data may be used to annotate the frames for display on the client device.

Disclosed approaches provide flexibility on how and where an Intelligent Video Analytics (IVA) system that is implemented using a distributed computing architecture with edge and/or cloud components may analyze video streams to generate metadata and store the metadata and video data of the video streams. For example, a video stream may be analyzed and metadata may be generated and/or stored with timestamps using any number of edge and/or core devices of a cloud computing system. The corresponding video data may be processed and stored with timestamps using any number of edge and/or core devices of the cloud computing system, one or more of which may be different than those that processed the metadata. In processing a request or query, corresponding metadata and video data may be retrieved from the data stores (e.g., by a core and/or edge device) using timestamps and annotation may be performed by an edge device, a core device, and/or the client device. Where video data is annotated on a cloud device, the annotated video may be provided to the client device for display.

BRIEF DESCRIPTION OF THE DRAWINGS

The present systems and methods for to on demand annotation of metadata on video streams are described in detail below with reference to the attached drawing figures, wherein.

DETAILED DESCRIPTION

Figure 1:
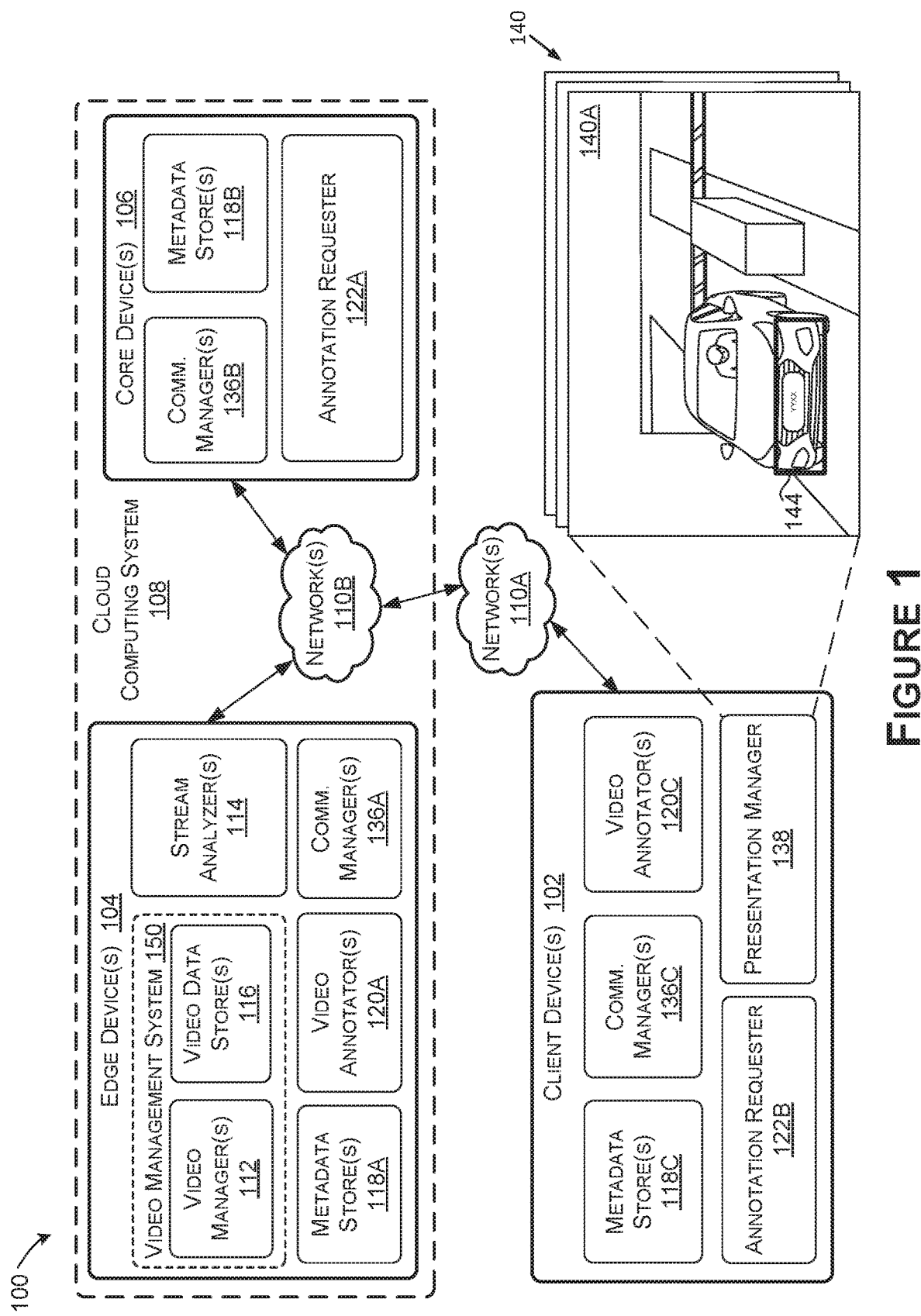
FIG. 1 is a diagram of an example of a video annotation system, in accordance with some embodiments of the present disclosure.

Systems and methods are disclosed related to overlaying metadata on video streams on demand for intelligent video analytics. Systems and methods are disclosed that may store video data of video streams and metadata of the video streams in separate data stores (e.g., on different cloud devices) with timestamps that associate frames of the video streams with corresponding portions of the metadata. In processing a request to view a video stream that is annotated with metadata, the timestamps may be used to retrieve the related frames and metadata across the data stores, and the metadata may be used to generate an overlay of the frames for viewing.

Disclosed embodiments may be implemented using a variety of different systems such as automotive systems, robotics, aerial systems, boating systems, smart area monitoring, simulation, and/or other technology areas. Disclosed approaches may be used for any perception-based or more generally image-based analysis, monitoring, and/or tracking of objects and/or the environment.

For smart area monitoring, various disclosed embodiments may be incorporated into systems and/or methods described in U.S. Non-Provisional Application No. 16/365,581, filed on Mar. 26, 2019, and titled "Smart Area Monitoring with Artificial Intelligence," which is hereby incorporated by reference in its entirety.

In contrast to conventional systems, an annotated version of a video may be generated in response to a request, where the request provides (e.g., implicitly, explicitly, or inherently) one or more timestamps used to retrieve the relevant video data and the corresponding metadata that was generated during the video analysis process. As a result, the video data that is retrieved using the timestamp(s) may be annotated (e.g., only the video from 1 p.m. to 4 p.m.) using the metadata that is relevant to the request (e.g., only annotate people but no other objects, color code book bags, tag vehicle license plates, etc.) and that corresponds to what is depicted in the frames represented by the retrieved video data.

In some examples, the request(s) may be provided by a client device to a cloud computing system. For example, a core device(s) of the cloud computing system may receive the request. Where one or more portions of the video data and/or metadata to be used for annotation are located in the core network, the core device(s) may retrieve that portion(s) and provide (directly or indirectly) the data to a video annotator (e.g., to an edge device and/or the client device) for generation of one or more overlays of the video data.

One or more portions of the video data and/or metadata to be used for annotation may additionally or alternatively be located external to the core network, such as at one or more edge devices of the cloud computing system and/or an external storage system (e.g., on a remote network or video management system which may be implemented on an external cloud storage system). In these cases, the core device(s) may provide information sufficient for the other device(s) to retrieve the requested data.

In some non-limiting embodiments, the data used for annotation may be distributed across any number of devices, systems, and/or locations, while the annotation may occur at a single device, system, and/or location. In some examples, the device, system, and/or location that uses the retrieved information to annotate the video transmits (e.g., streams) the annotated data to the client device for display thereon.

For example, if a portion of video data is located at and/or managed by an edge device(s), the core device(s) may provide one or more timestamps that the edge device(s) may use to retrieve the corresponding video data. In some examples, the core device(s) may use an index and/or search system to locate the appropriate edge device(s). The edge device(s) may then provide the retrieved portion(s) of the video data to the client device, a core device(s), and/or another edge device(s) that performs annotation. In other examples, the edge devices(s) that retrieve the video data may perform the annotation(s).

Similarly, if a portion of metadata is located at and/or managed by an edge device(s), the core device(s) may provide one or more timestamps that the edge device(s) may use to retrieve the corresponding metadata. Additionally, one or more metadata criteria (e.g., an identification of attributes and/or other indicators of the metadata) may be provided (e.g., indicators of metadata describing people objects in a frame, metadata describing blue pickup trucks, etc.). In some examples, the core device(s) may use an index and/or search system to locate the appropriate edge device(s) based on the timestamps and/or metadata criteria or indicator(s). For example, a request or query to find "blue pickup trucks on the garage camera between 2 p.m. and 2:30 p.m." may cause the retrieval of the metadata with timestamps corresponding to a range of time between 2 p.m. to 3:30 p.m., but only the portion of metadata in that timestamp range that comprises objects classified as a blue pickup truck (the other portions of the metadata may be stored in a same or different metadata store). The edge device(s) may then provide the retrieved portion(s) of the metadata to the client device, a core device(s), and/or another edge device(s) that performs annotation. In other examples, the edge devices(s) that retrieves the metadata may perform the annotation(s).

Thus, a request may be received that specifies or otherwise indicates timestamps that are used to identify one of more frames of a video stream(s). Each timestamp may correspond to a frame of a video stream (e.g., a video stream with framerate of 30 fps may have a first frame with a timestamp and the subsequent frame may have a timestamp 33 ms later). A device and/or system (e.g., an edge device) that stores the video data of a video stream may store the video data indexed or otherwise associated with the timestamps (e.g., locally such as on site or remotely to an external location), such as in real time as the video data is generated. In some examples, a device (e.g., an edge device) may be a video camera that captures the video stream and video cameras in a shared geographic location may store corresponding video streams to a common storage system.

Time synchronization may be implemented across devices of the cloud computing system in order for the timestamps and video data to be synchronized across the cloud computing system. For example, the devices that store and/or process video data for storage (e.g., the camera device(s)) may connect to an Internet Protocol (IP) network and runs a Network Time Protocol (NTP) daemon to sync time with other connected devices and determine synchronized timestamps for incoming video data). When the video data is processed and/or generated, the timestamps may be associated with corresponding frames for storage.

Similarly, a device and/or system (e.g., an edge device) that analyzes, stores, and/or generates the metadata of a video stream that is used for annotations may associate the metadata with the timestamps so that the metadata is indexed or otherwise associated with the timestamps in storage (e.g., local storage such as on site or remotely at an external location). The time synchronization system used for video data may similarly be implemented on the device(s) for metadata. This may also occur in real time as the video data is generated, received, and/or analyzed. In some examples, the device(s) (e.g., edge device) that analyzes and generates metadata from video data may be the same device(s) that generates or captures the video data (or a device(s) in a shared geographic location), such as the video camera that captures the video stream. Video cameras in a shared geographic location may store corresponding metadata of video streams to a common storage system.

When video stream data is analyzed (e.g., analytic engines performing object tracking, face recognition, object classification, etc.), the metadata may be created that is indicative of results of the analytics processes that were performed. Metadata may be generated with respect to objects or aspects that are identified in one or more frames of a video. For example, metadata could represent the location(s) and/or dimensions of a bounding box (e.g., a geometric shape whose location and dimensions can change frame-to-frame indicating the temporal tracking of an object) of an object and/or could represent other attributes of an identified object in a video. Metadata can represent any detectable aspect of a video frame such as visual features of the video frame. Each portion of metadata may be associated with a frame of the video data such as by using a timestamp that is synchronized with the frame of video that the portion of metadata describes.

Thus, in contrast to conventional systems, matching timestamps of the video data and the metadata may enable the ability to store each across multiple devices and/or locations. The video data for a video stream may reside in one or more video data stores, which can be in a different location (e.g., geographic location) or device from the metadata that resides in one or more metadata stores. This may enable video analytics and metadata generation for a video stream to be decoupled from video storage providing significant flexibility in how distributed computing architectures are implemented. For example, a video data store and/or video generation could be located on an edge device while the metadata store(s) and/or metadata generation and video analysis may be located on a core device(s) or other edge device(s) of a cloud computing system. The metadata store can be co-located with the video data store(s) or may reside elsewhere since the timestamps of the stored video data is synced with the timestamps of the corresponding stored metadata.

One or more overlays to a video may be constructed using the retrieved video data and the retrieved metadata to display a version of the video frames with visual indications of the metadata. Since the metadata that is retrieved may be limited to the metadata that reflects the request, only the metadata indicated or otherwise relevant to the request may be reflected in the generated overlay(s). The generated overly(s) can be baked into the video frames or be transmitted with and/or in association with corresponding video data for display with the video data. Thus, in contrast to conventional systems, copies of a video stream need not be stored pre-processed, pre-annotated, and pre-labeled, for each type or set of annotations. As a result of some embodiments of the systems and methods described herein, the storage demands placed on an IVA system may be reduced while supporting a large variety of overlays to be generated for a video stream.

With reference to FIG. 1, FIG. 1 is an example system diagram of a video annotation system 100, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

The video annotation system 100 may include, among other things, a client device(s) 102, a cloud computing system 108, an edge device(s) 104, and/or a core device(s) 106. In any example, there may be any number of client device(s) 102, edge device(s) 104, and/or core device(s) 106. The video annotation system 100 (and the components and/or features thereof) may be implemented using one or more computing devices, such as the computing device 1200 of FIG. 12, described in more detail below.

The client device(s) 102 may include a smart phone, a laptop computer, a tablet computer, a desktop computer, and/or another type of device capable of requesting and/or presenting annotated video streams, such as an annotated video stream 140. By way of example and not limitation, the client device(s) 102 may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a virtual machine(s), a video camera, a surveillance device or system, an entertainment system, a vehicle computer system, an embedded system controller, a remote control, an appliance, a consumer electronic device, a workstation, an edge device, any combination of these delineated devices, or any other suitable device.

The client device(s) 102 may include an annotation requester 122B, a metadata store(s) 118C, a video annotator 120C, a communication manager(s) 136C, and presentation manager 138. Although only a few components and/or features of the client device(s) 102 are illustrated in FIG. 1, this is not intended to be limiting. For example, the client device(s) 102 may include additional or alternative components, such as those described with respect to the computing device 1200 of FIG. 12.

The cloud computing system 108 may include one or more edge device(s) 104, one or more core device(s) 106, and/or one or more network(s) 110B. Although only a few components and/or features of the cloud computing system 108 are illustrated in FIG. 1, this is not intended to be limiting. For example, the cloud computing system 108 may include additional or alternative components, such as those described below with respect to the computing device 1200 of FIG. 12. In at least one embodiment, the cloud computing system 108 may be implemented, at least in part, in the data center 1300 of FIG. 13.

The edge device(s) 104 may include a video management system 150 having one or more video managers 112 and one or more video data stores 116, one or more stream analyzer(s) 114, one or more metadata store(s) 118A, and/or one or more communication manager(s) 136A. Although only a few components and/or features of the edge device(s) 104 are illustrated in FIG. 1, this is not intended to be limiting. For example, the edge device(s) 104 may include additional or alternative components, such as those described with respect to the computing device 1200 of FIG. 12.

Components of the video annotation system 100 may communicate over network(s) 110A and 110B (referred to collectively or individually herein as "network(s) 110"). The network(s) 110 may include a wide area network (WAN) (e.g., the Internet, a public switched telephone network (PSTN), etc.), a local area network (LAN) (e.g., Wi-Fi, ZigBee, Z-Wave, Bluetooth, Bluetooth Low Energy (BLE), Ethernet, etc.), a low-power wide-area network (LPWAN) (e.g., LoRaWAN, Sigfox, etc.), a global navigation satellite system (GNSS) network (e.g., the Global Positioning System (GPS)), and/or another network type. In any example, each of the components of the video annotation system 100 may communicate with one or more of the other components via one or more of the network(s) 110. In some examples, the network(s) 110B comprises one or more core and/or edge networks of the cloud computing system 108 and the network(s) 110A comprises the Internet.

The video manager 112 may include one or more components and features for managing video stream data. The video manager 112 may be implemented or instantiated using one or more edge device(s) 104. In at least some embodiments, the video manager 112 may instantiated at least partially using a video or imaging device (e.g., a camera device, a sensor device, etc.). The video manager 112 may store video stream data in one or more of the video data stores 116 such that the video stream data is synchronized across any number of devices using timestamp indications associated with frames of the video stream data. For example, the video manager 112 may connect to an Internet Protocol (IP) network and run a Network Time Protocol (NTP) daemon to sync time with other connected devices across the cloud computing system (e.g., other video managers 112 and/or one or more stream analyzers 114 for storage of metadata in one or more of the metadata stores 118). As an example, the video manager can process and/or generate the video with timestamps associated with the corresponding frame of the video. The video data with the associated timestamp may be stored in one or more of the video data store(s) 116A on the edge device 104 of the video manager 112 or on one or more video data store(s) 116 that may be located on any number of connected edge device(s) 104 or client device(s) 102 (or on a cloud computing system external to the cloud computing system 108).

In at least some embodiments, the video manager 112 may comprise a video streaming server, such as a Real Time Streaming Protocol (RTSP) server, which may be used to establish and control media sessions between any of the various end points of the video annotation system 100. For example, a video annotator 120 may communicate with the streaming servers in order to receive image data and/or video data for annotation (e.g., using Representational State Transfer Application Program Interfaces). In various examples, communications may be provided between the devices over an Open Network Video Interface Forum (ONVIF) bridge which may define rules for how software should query devices for their names, settings, streams, and the like. ONVIF "calls" or messages may be sent to an ONVIF compliant device and the device may return an RTSP address to retrieve corresponding video and/or image data via the RTSP server. In some embodiments, the video manager(s) 112 may also provide video data to the streaming analyzer(s) 114 using RTSP communications.

The stream analyzer(s) 114, may include one or more components and features for analyzing video stream data (e.g., analytic engines performing object tracking, face recognition, object classification, etc.).

The stream analyzer(s) 114, may be configured to receive and process video data. For example, the stream analyzers(s) 114 may receive video data from a video manager 112 and/or from a video data store(s) 116. The stream analyzer(s) 114 may be configured to process the video data to detect object(s) from the video data, such an object(s) depicted in one or more of the frames of a video stream. The stream analyzer(s) may be configured to determine object attributes, such as of objects that may be detected using the stream analyzer(s) 114. The stream analyzer(s) 114 may be configured to track objects represented in the video data. In embodiments where there are multiple stream analyzers 114, different stream analyzers 114 may perform a different analysis procedure on the video data and may generate different metadata using the different analysis procedure. For example, one stream analyzer 114 may use one or more Machine Learning Models (MLMs) to detect vehicle and/or vehicle locations in video frames and store corresponding metadata in the metadata store(s) 118. Another stream analyzer 114 may extract characteristics of the detected vehicles using one or more MLMs and store corresponding metadata in the metadata store(s) 118. Yet another stream analyzer 114 may use one or more MLMs to detect pedestrians and/or pedestrian locations in video frames and store corresponding metadata in the metadata store(s) 118. These stream analyzers 114 may operate on the same or different video streams in serial and/or in parallel. As described herein, the MLMs may be implemented using one or more GPUs and/or vGPUs, such as of the data center 1300 of FIG. 13.

The stream analyzer(s) 114 may include one or more components and features for generating the metadata. The metadata may be generated with respect to objects or aspects that are identified in one or more frames of video stream data. For example, metadata could represent the location(s) and/or dimensions of a bounding box (e.g., a geometric shape whose location and dimensions can change frame-to-frame indicating the temporal tracking of an object) of an object and/or could represent other attributes of an identified object in a video. The metadata generated by the stream analyzer(s) 114 can represent any detectable aspect of a video frame such as visual features of the video frame. The stream analyzer(s) 114 may generate metadata that may be associated with a frame of video data using a timestamp. For example, the stream analyzer(s) 114 may generate metadata for a frame of video data with a specific timestamp and may synchronize the frame and metadata by associating the metadata with that timestamp. As an example, the timestamp associated with the metadata may be sourced from the video stream data and/or may be sourced by the stream analyzer(s) 114 (e.g., over IP network, NTP daemon, etc.). In various examples, timestamps of video data and metadata may be synchronized across each of the video managers 112 and the stream analyzers 114 (e.g., using the same time synchronization system or method). The stream analyzer(s) 114 may transmit the generated metadata for each frame (e.g., with timestamp), which has been associated with a timestamp, to one or more metadata store(s) 118 for storage therein.

The metadata store(s) 118A, the metadata store(s) 118B, and the metadata store(s) 118B (referred to collectively or individually herein as "metadata store(s) 118") may be located on the edge device(s) 104, the core device(s) 106, and/or the client device(s) 102. In some non-limiting embodiments, the metadata used for annotation may be distributed among any number of metadata store(s) 118 across any number of devices, systems, and/or locations. For example, metadata corresponding to a video stream may be located on a combination of metadata store(s) 118A on an edge device(s) 104 and metadata store(s) 118B on one or more core device(s) 106. The metadata may be indexed on the one or more metadata store(s) 118 based on any number of number of methods that may include but are not limited to, the timestamp(s) of the metadata, the classification of objects described by the metadata, the location at which the metadata was generated, attributes of the associated video data, or any combination of methods. As an example, metadata that describes vehicular objects depicted in the corresponding video data may be indexed and located in a first metadata store, while metadata that describes people objects may be indexed and located in a second metadata store.

The annotation requester 122A, and annotation requester 122B (referred to collectively or individually herein as "annotation requester 122") may generate a request, where the request provides one or more timestamps used to retrieve the corresponding video data (e.g., only the video from 1 p.m. to 4 p.m.) and the corresponding metadata that was generated during the video analysis process. For example, the annotation requester(s) 112 may generate a request that is transmitted to one or more video annotator(s) 120, described herein, that may use the provided timestamps to retrieve video data from one or more video data store(s) 116 and retrieve metadata from one or more metadata store(s) 118. For example, a request may indicate implicit or explicit timestamps that correspond to video data in one of more video data store(s) 116. The annotation requester 122 may also generate a request providing one or more criteria or indicators of metadata (e.g., only metadata indicative of people but no other objects, metadata describing vehicles, etc.) that corresponds to metadata in the one or more metadata store(s) 118. In some examples, the request can be generated in response to a query from which one or more timestamps may be determined (e.g., searching for objects within a time window to find frames in which objects are depicted). In some examples, the requests can be pre-determined or otherwise derived without a user supplying a query. For example, one or more of the devices of the cloud computing system 108 may include a media server for providing annotated video data using WebRTC. One or more of the devices of the cloud computing system 108 may also provide Video Management System APIs which may be used for requesting the annotated video data.

In embodiments, the annotation requester(s) 122 and/or the presentation manager(s) 138 may communicate with one or more devices of the cloud computing system 108 to request and/or present annotated video data using REST APIs and/or Web Real-Time Communication (WebRTC) APIs.

The video data store(s) 116 may be located on one or more edge device(s) 104. In some non-limiting embodiments, the video data may be distributed among any number of video data store(s) 116 across any number of devices, systems, and/or locations. For example, video data corresponding to one or more video streams may be located on a combination of video data store(s) 116 on multiple edge device(s) 104. The video from a video stream may be indexed among one or more video data store(s) 116 based on any number of number of factors that may include but are not limited to, the timestamp(s) of the video data, the source of the video stream, attributes of the video data, or any combination thereof. As an example, video data generated from a first camera or imaging device may be indexed and located in a first video data store 116, while video data generated from a second camera or imaging device may be indexed and located in a second video data store 116.

The video annotator 120A and video annotator 120C (referred to collectively or individually herein as "video annotator 120") may be configured to generate overlay data in association with frames of video data (e.g., using one or more GPUs and/or vGPUs). A video annotator 120 may use metadata from one or more metadata store(s) 118 and video data from one or more video data store(s) 116 to construct one or more overlays to frames of a video. In some examples, the overlay data may be incorporated into the video frames associated with the video data and may take the form of visual indications of the metadata (e.g., bounding boxes, bounding shapes, color highlights, alteration of pixels of the video frame, etc.). In other examples, the overlay data may be transmitted with and/or otherwise associated with corresponding video data to a presentation manager 138 on one or more client device(s) 102, for display with the video data. As shown by way of example, the overlay data may represent a bounding box 144 or other visual indicator used to annotate corresponding video data. In various examples, the overlay data may comprise image data representative of at least one or more visual indicators and may or may not be stored with the video data that is being annotated.

In various embodiments, a video annotator 120 may receive one or more requests from an annotation requester 122, indicating one or more timestamps and indications of metadata. The timestamps and indications of metadata may be used to retrieve relevant video data and metadata from a metadata store(s) 118 and a video data store(s) 116. In some embodiments, only metadata that reflects the request may be retrieved from the metadata store(s) 118 and only the metadata indicated or otherwise relevant to the request may be reflected in the overlay(s) generated by the video annotator(s) 120. In some examples, the metadata reflected in the generated overlay(s) may be a subset of the metadata that is retrieved from the metadata store(s) 118.

The communication manager(s) 136A, communication manager(s) 136B, and communication manger(s) 136C (referred to collectively or individually herein as "communication manager(s) 136"), may include one or more components and features for communicating across one or more networks, such as the network(s) 110. The communication manager(s) 136 may be configured to communicate via any number of network(s) 110, described herein. For example, to communicate in the video annotation system 100 of FIG. 1, the client device(s) 102 may use an Ethernet or Wi-Fi connection through a router to access the Internet in order to communicate with the edge device(s) 104, the core device(s) 106, other client device(s) 102, and/or any other devices within the cloud computing system 108. In some examples, the core device(s) 106 and the edge device(s) 104 of the cloud computing system 108, may communicate with other core device(s) 106 and/or edge device(s) 104 located within the cloud computing system 108.

A communications manager 136 may be configured to manage communications received by its respective system (e.g., requests, queries, video data, and/or metadata, overlay data, etc.) and/or provided by the respective system (e.g., requests, video data, and/or metadata, overlay data, etc.), such as amongst any of the client device(s) 102, the edge device(s) 104, the core device(s) 106 and/or other components that may be included in the video annotation system 100. Additionally or alternatively, the communications manager 136 may manage communications within the respective system.

The presentation manager 138 of the client device(s) 102 may include one or more components and features for managing the presentation of frame(s) of a video stream, such as a frame 140A of the annotated video stream 140. The frame(s) of the annotated video stream 140 may be represented in video data and may be associated with overlay data. For example, the presentation manager 138 may manage the presentation of overlay data transmitted from a video annotator 120, where the overlay data may be incorporated into video frames (e.g., in video data) associated with visual indications of metadata. In some examples, the presentation manager 138 may use a combination of video data and overlay data to present and generate the frame(s) of the annotated video stream 140.

Figure 2A:
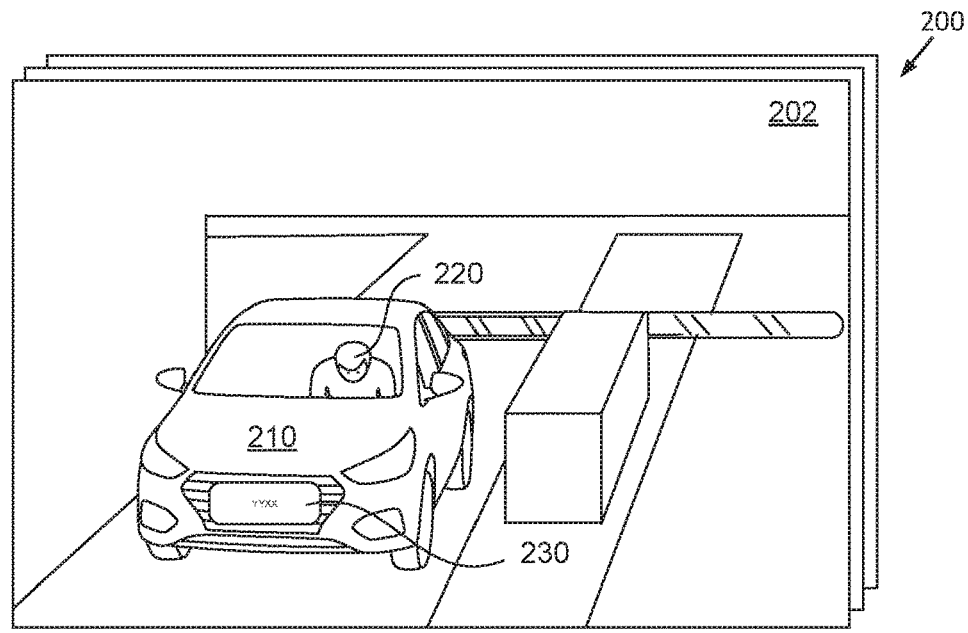
FIG. 2A is an illustration of an example video stream, in accordance with some embodiments of the present disclosure.

Now referring to FIG. 2A, FIG. 2A is an illustration of an example video stream 200, in accordance with some embodiments of the present disclosure. A frame 202 of the video stream 200 may contain any number of objects, such as objects 210, 220, and 230 that may be tracked, classified, detected, and/or identified (e.g., tracking moving objects, color detection, facial recognition, text from vehicle license plates, etc.) by the stream analyzer(s) 114 of FIG. 1 to extract metadata therefrom.

Figure 2B:
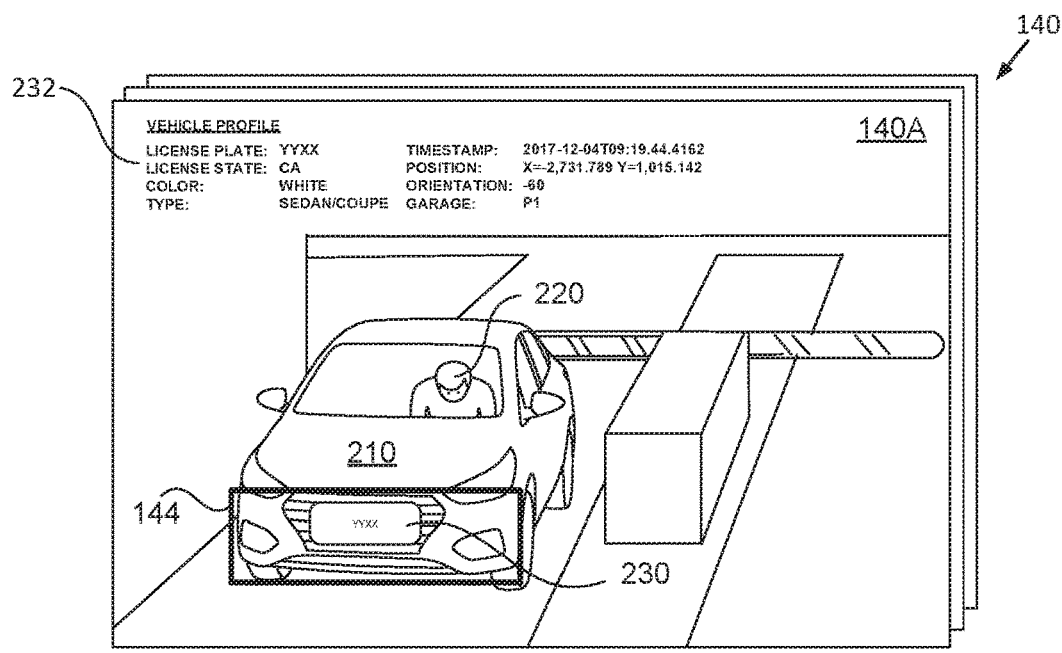
FIG. 2B is an illustration of an example annotated video stream which may correspond to the video stream of FIG. 2A presented with overlay, in accordance with some embodiments of the present disclosure.

Now referring to FIG. 2B, FIG. 2B is an illustration of an example of the annotated video stream 140 which may correspond to the video stream 200 of FIG. 2A presented with overlay, in accordance with some embodiments of the present disclosure. The frames of the annotated video stream 140, such as the frame 140A may be presented with visualizations represented by overlay data that is incorporated into the video data and/or provided as metadata. For example, the overlay data provided by a video annotator 120 of FIG. 1 may be used by the presentation manager 138 of FIG. 1 to present one or more frames of the annotated video stream 140 with visualizations corresponding to the metadata, such as the bounding box 144 and textual information 232. While the bounding box 144 and the textual information 232 is shown, visualizations of may be presented as a geometric shape, boundary, textual data, color, and/or any other suitable visual indication of metadata.

Figure 3:
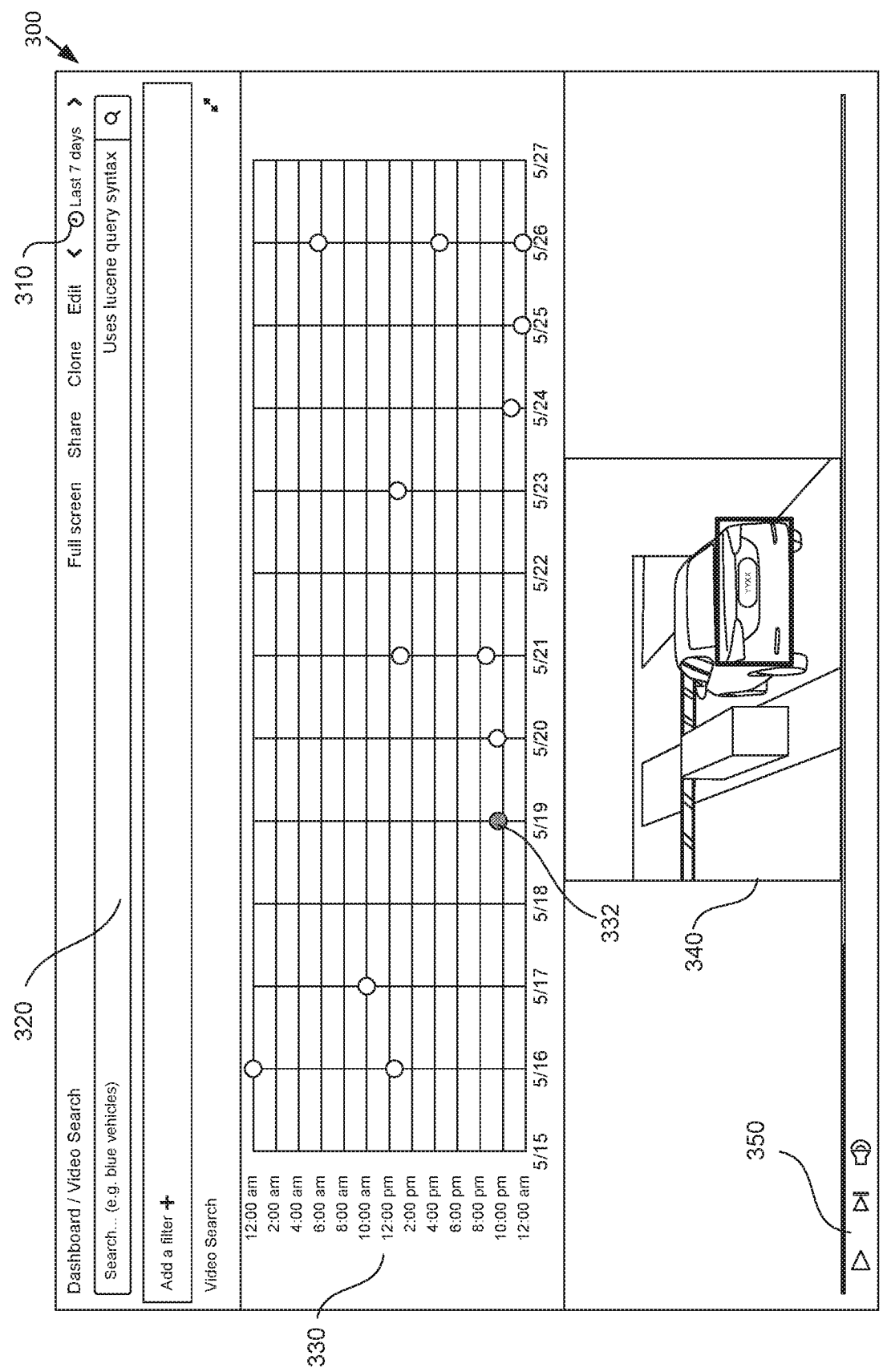
FIG. 3 is a diagram illustrating an example of an interface which may be used to request video annotations using queries, in accordance with some embodiments of the present disclosure.

Now referring to FIG. 3. FIG. 3, is a diagram illustrating an example of an interface 300 which may be used to request and visualize video annotations using queries, in accordance with some embodiments of the present disclosure. A user may use the interface 300 to cause a client device 102 to request annotated video, such as by providing a query using an annotation requester 122 of FIG. 1 to cause generation of annotated video. The query may, as a specific and non-limiting example, ask to find all blue vehicles identified in one or more video streams over the last 7 days. The user may provide the query to the interface 300 using any number of approaches. For example, the user may provide one or more portions of the query and/or information used to generate the query to a search bar 320 and/or time interval selector 310. In response to a query, the interface 300 may provide a display 330 indicating video data and associated metadata satisfying the query (e.g., as query results). For example, the display 330 may show on which days (or other time intervals) and at which times (e.g., corresponding to a start time, end time, etc.) a query result has been found in which a blue vehicle has been identified in video stream data (e.g., as indicated by metadata). A query result may comprise a video clip, and/or time indicators that enable playback of at least a portion of a video stream that corresponds to the query result. In some examples, the interface 300 may display generated annotated video in a video display region 340 (e.g., based on a selection of a query result indicator 332). The interface 300 may also include video controls 350 that allow a user to control playback of the video display region 340.

Figure 4:
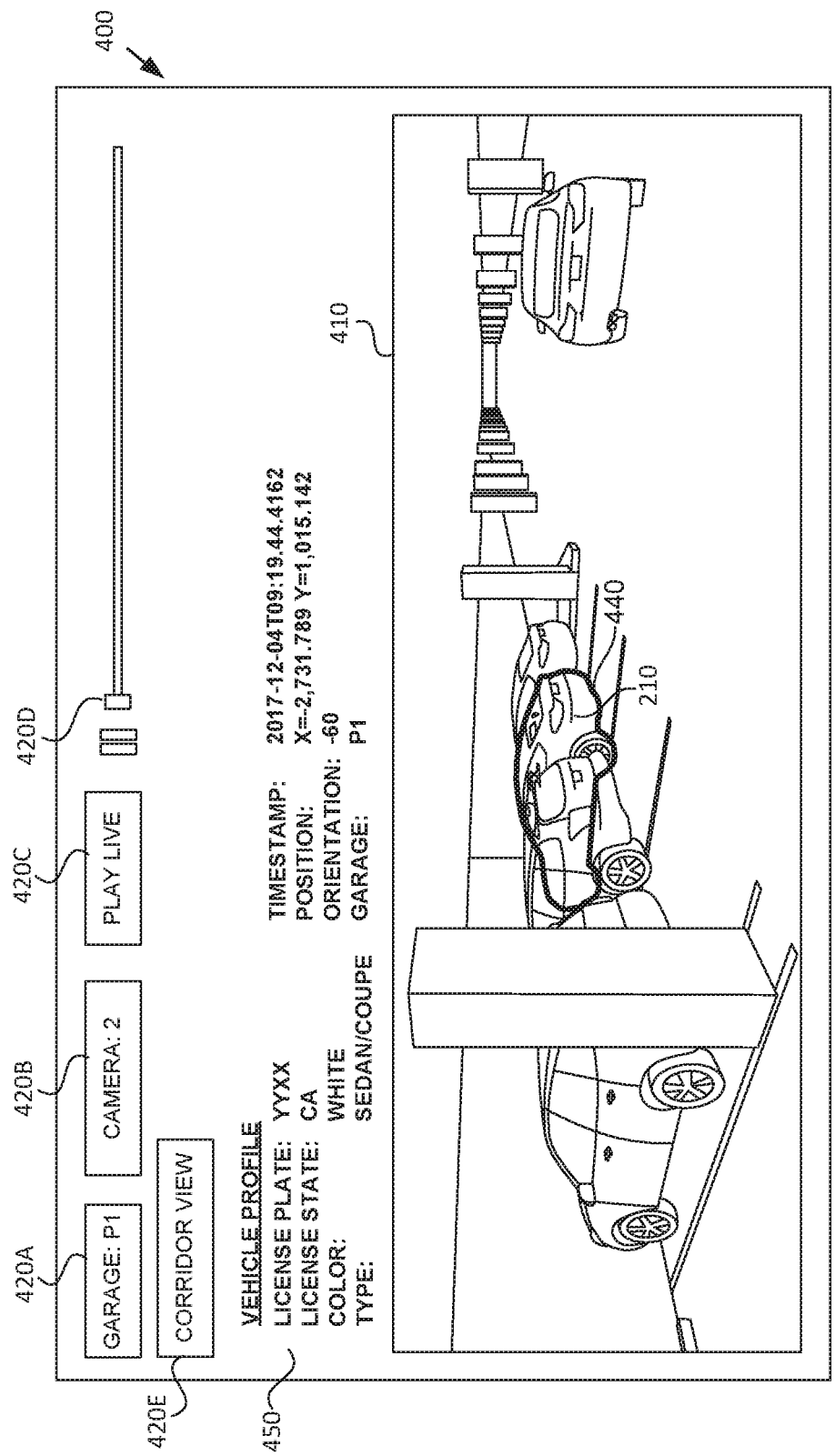
FIG. 4 is a diagram illustrating an example of an interface which may be used to request and view video annotations, in accordance with some embodiments of the present disclosure.

Now referring to FIG. 4. FIG. 4, is a diagram illustrating an example of an interface 400 which may be used to request and view video annotations, in accordance with some embodiments of the present disclosure. A user may use the interface 400 to view annotated video and associated information. For example, the user may use the interface 400 to view generated annotated video in a video display region 410. The interface 400 may include video controls 420A, 420B, 420C, 420D, and/or 420E that allow a user to control playback of the video display region 410. In various examples, a request or query for annotated video data may be provided by a user using one or more of the vide controls 420A, 420B, 420C, 420D, and/or 420E.

In some examples, the video display region 410 can present video of detected objects, such as the object 210. In some examples, the video display region 410 can present overlay data that was generated in response to a request and/or query transmitted from an annotation requester 122 of FIG. 1. As described herein, the overlay data may be visualized in any number of ways, such as a bounding shape 440 or other indicator that may visually emphasize the object(s) identified in the video stream and captured by associated metadata. In some examples, information corresponding to objects in the video stream may be retrieved from one or more of the metadata store(s) 118 and may be provided to the video annotator(s) 120 for generation of annotated video data. The annotated video data may be provided by the video annotator(s) 120 to a presentation manager 138 to display the annotated video data on the interface 400. As described herein, a presentation manager 138 may receive one or more portions of the overlay data baked into frames of video data, and/or one or more portions of the overlay data may be in the form of metadata used to generate the visualizations. As an example, metadata may be used to generate the textual information 450 that may be separated from the video display region 410 or included in the video display region 410.

Figure 5:
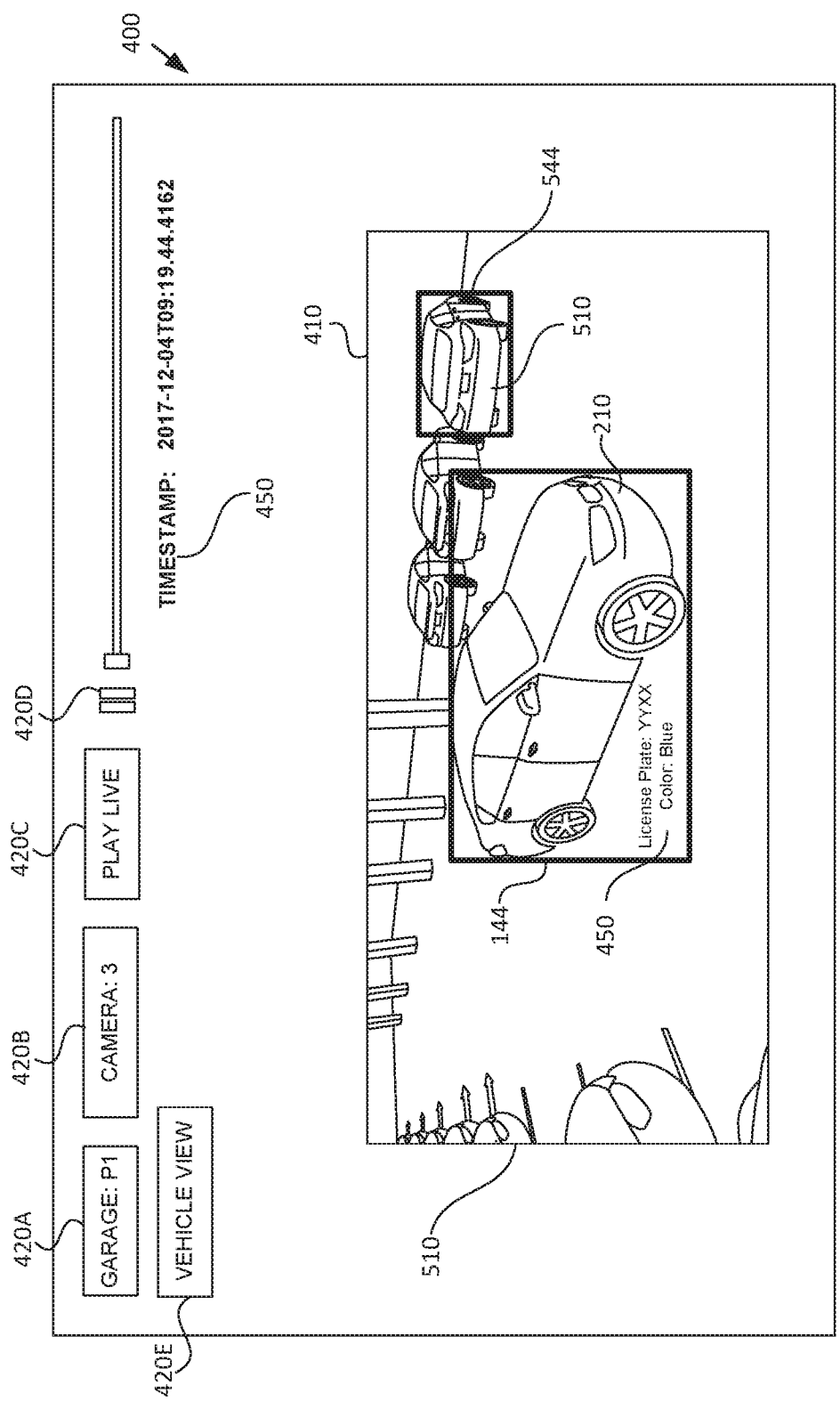
FIG. 5 is a diagram illustrating an example an interface which may be used to request and view video annotations, in accordance with some embodiments of the present disclosure.

Now referring to FIG. 5. FIG. 5, is a diagram illustrating an example of the interface 400 which may be used to request and view video annotations, in accordance with some embodiments of the present disclosure. The interface 400 of FIG. 5 may be similar to the interface 400 of FIG. 4, but from a vehicle view as opposed to a corridor view. For example, a user may have used the video control 420E to select a vehicle view of the object 210 as opposed to a corridor view in FIG. 4. By way of example and not limitation, the bounding box 144 is shown around the object 210. Bounding boxes may be shown for other requested objects, such as a vehicle 510 with a bounding box 544. Also by way of example and not limitation, at least a portion of the textual information 450 is shown as being displayed at location that corresponds to a location of the bounding box 144.

Figure 6:
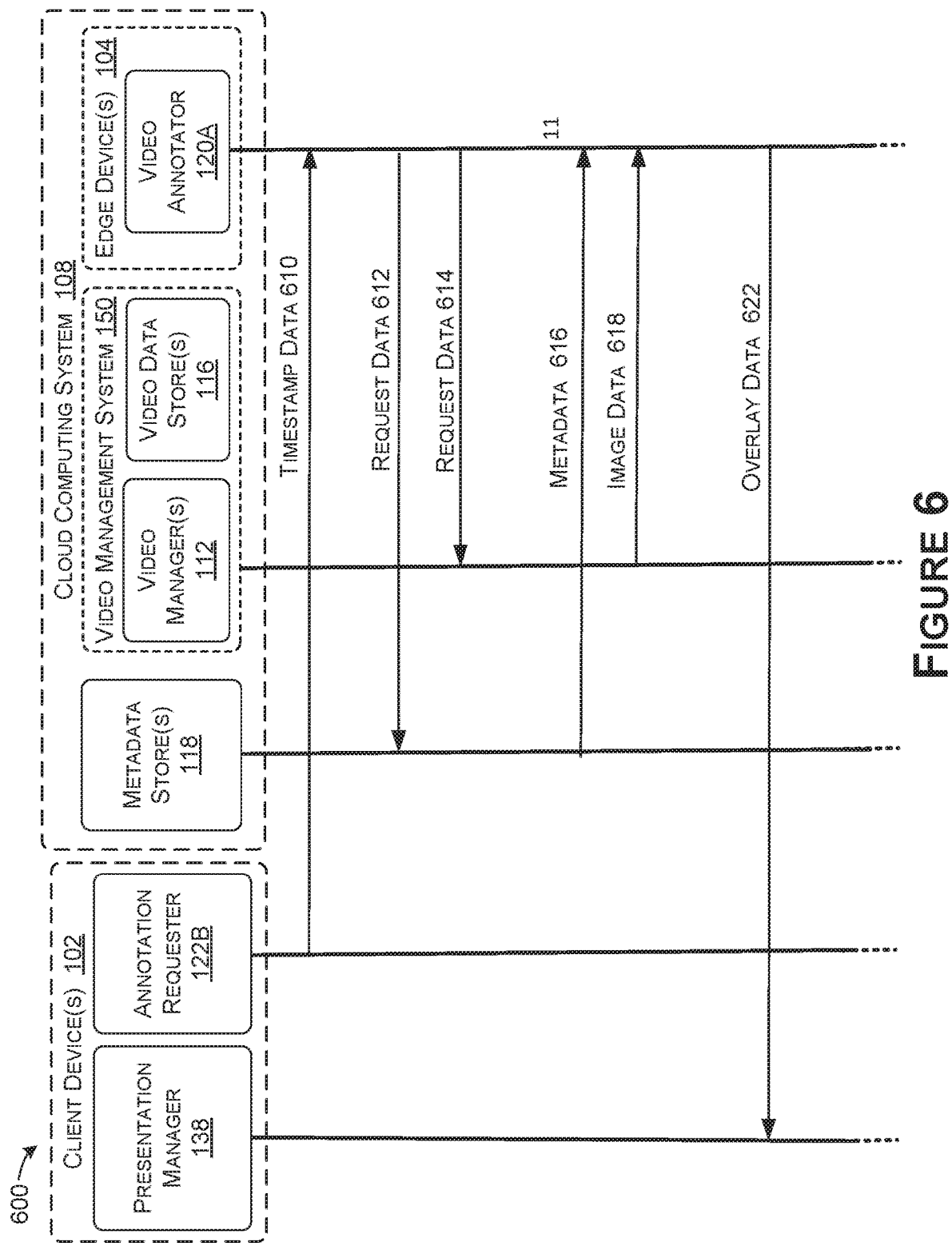
FIG. 6 is a flow diagram showing an example of communications involving a client device and a cloud computing system in which an edge device retrieves metadata and video data for generating an overlay of a video stream, in accordance with some embodiments of the present disclosure.

Now referring to FIG. 6, FIG. 6, is a flow diagram showing an example of communications involving a client device and a cloud computing system in which an edge device retrieves metadata and video data for generating an overlay of a video stream, in accordance with some embodiments of the present disclosure. It should be understood that this and other arrangements described herein are set forth only as examples. At a high level, communications 600 may involve one or more of the client device(s) 102, the annotation requester(s) 122, the metadata store(s) 118, the video management system 150, the video manager 112, the video data store(s) 116, and/or the video annotator 120A executing on and/or instantiated using one or more of the edge device(s) 104. While certain data is shown as being sent or received by the client device(s) 102 and the edge device(s) 104, this is not to imply that one or more of the other components shown cannot be included in the client device(s) 102 and/or the edge device(s) 104. In examples, any number of edge devices 104 and/or core devices 106 may be used to implement the communications 600 and additional communications between devices may be involved, which are not shown.

In some examples, the communications 600 may include transmitting timestamp data 610 between one or more devices. For example, an annotation requester 122 may transmit timestamp data 610 to a video annotator 120A located on an edge device(s) 104. The timestamp data 610 may represent any indication of one or more timestamps that may be used to identify one of more frames of a video stream(s). For example, timestamp data 610 may represent at least one timestamp corresponding to a frame(s) of a video stream. As another example, the timestamp data 610 may represent information used to derive or determine the at least one timestamp. For example, the information may include a request type and/or a query that indicates the at least one timestamp or may include a starting timestamp of a video stream that is requested for annotation. In some examples, the timestamp data 610 may be part of a request from the annotation requester 122A of a client device 102 for annotated video, as described herein. For example, the request may indicate metadata, one or more timestamps, one or more video streams, and the like for annotation.

Upon receiving the timestamp data 610 transmitted from an annotation requester 122, the video annotator 120A may use the timestamp data 610 to generate request data 612 representative of one or more requests that may be transmitted to the metadata store(s) 118 so that metadata 616 corresponding to the at least one timestamp indicated by the timestamp data 610 can be retrieved. In some examples, the request(s) may also be based on indications of the metadata included in the request from the annotation requester 122 (e.g., one or more attributes included in the request). The video annotator 120A may also use at least the timestamp data 610 to generate request data 614 representative of one or more requests that may be transmitted to the video data store(s) 116 so that the image data 618 (e.g., video data) corresponding to the at least one timestamp can be retrieved. The order in which the request data 612 and 614 are shown as being transmitted is not intended to be limiting.

Upon receiving the request data 612 transmitted from the video annotator 120A, the metadata store(s) 118 can retrieve the metadata 616 corresponding to at least the timestamp data 610. The metadata store(s) 118 may store the metadata indexed or otherwise associated with the at least one timestamp indicated by the timestamp data 610. The metadata store(s) 118 may further store the metadata indexed based on indications or other attributes of the metadata, which may be included in the request data 612. The retrieved metadata 616 may be transmitted by the metadata store(s) 118 to the video annotator 120A.

Upon receiving the request data 614 transmitted from the video annotator 120A, the video management system 150 can access the video data store(s) 116 to retrieve the image data 618 corresponding to the at least one timestamp indicated by the timestamp data 610. The video data store(s) 116 may store the image data 618 (or video data) indexed or otherwise associated with the at least one timestamp. The retrieved image data 618 may be transmitted by the video management system 150 to the video annotator 120A. In various examples, the request data 614 may be received by the video manager(s) 112 and the image data 618 may be retrieved and provided from the video data store(s) 116 by the video manager(s) 112.

Upon receiving the metadata 616 transmitted from the metadata store(s) 118 and the image data 618 transmitted from video management system 150, the video annotator 120A can generate overlay data 622 using the metadata 616 and the image data 618. The overlay data 622 may be transmitted by the video annotator 120A to one or more of the client device(s) 102 for display by the presentation manager 138.

Figure 7:
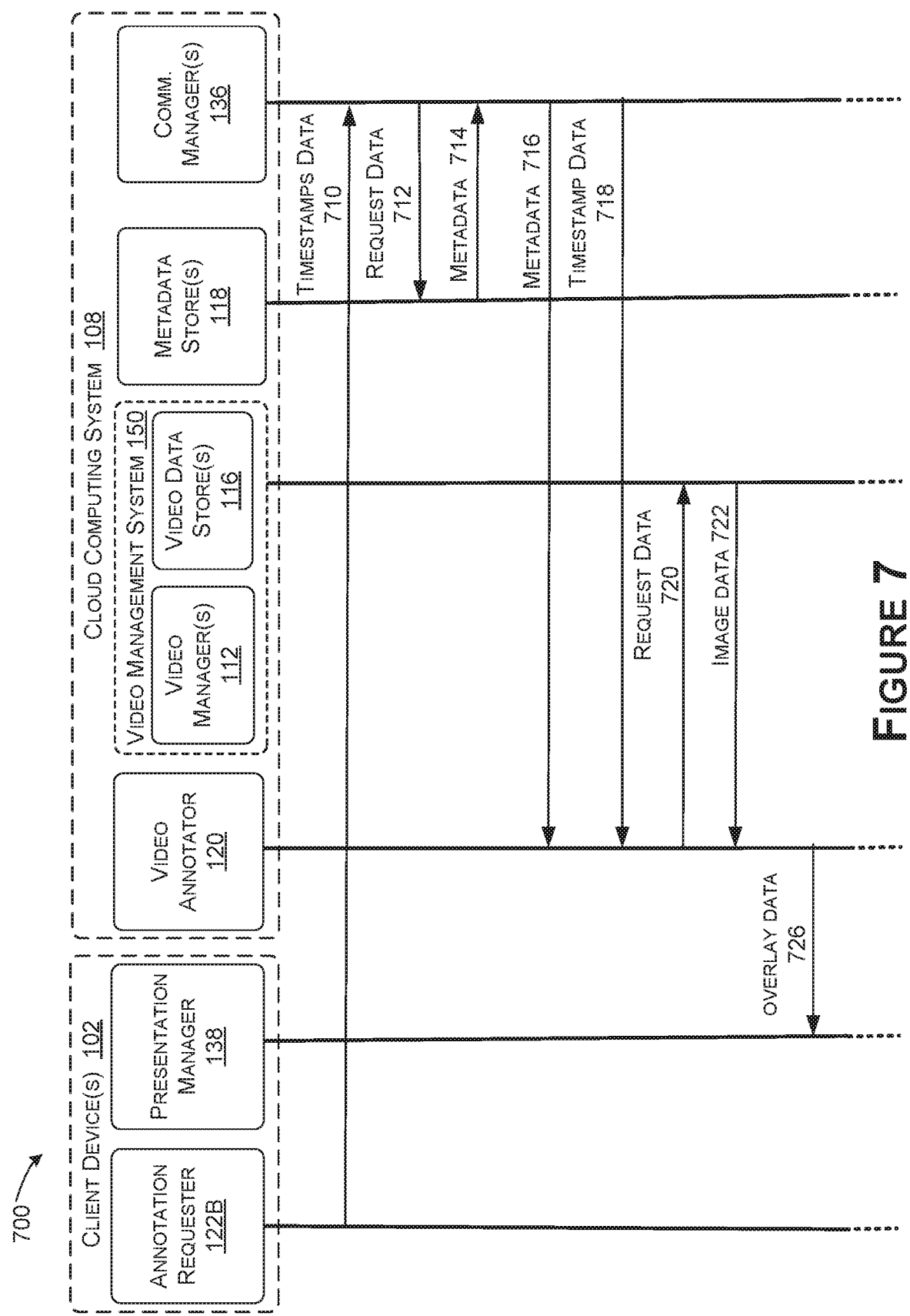
FIG. 7 is a flow diagram showing an example of communications involving a client device and a cloud computing system in which the cloud computing system retrieves and transmits metadata for generating an overlay on a video stream, in accordance with some embodiments of the present disclosure.

Now referring to FIG. 7. FIG. 7, is a flow diagram showing an example of communications involving a client device and a cloud computing system in which the cloud computing system retrieves and transmits metadata for generating an overlay on a video stream, in accordance with some embodiments of the present disclosure. It should be understood that this and other arrangements described herein are set forth only as examples. At a high level, communications 700 may involve the annotation requester 122B and the presentation manager 138 located on a client device(s) 102. The communications 700 may further involve the metadata store(s) 118, the video management system 150, the video manager(s) 112, the video data store(s) 116, a video annotator(s) 120, and the cloud computing system 108. While certain data is shown as being sent or received by the client device(s) 102 and the cloud computing system 108, this is not to imply that one or more of the other components shown cannot be included in the client device(s) 102 and/or the cloud computing system 108. In examples, any number of edge devices 104 and/or core devices 106 may be used to implement the communications 700 and additional communications between devices may be involved, which are not shown.

In some examples, the communications 700 may include transmitting timestamp data 710 between one or more devices. For example, an annotation requester 122B may transmit the timestamp data 710 representative of one or more timestamps to the cloud computing system 108. The timestamp data 710 may be similar to the timestamp data 610 described with respect to FIG. 6.

Upon receiving the timestamp data 710 transmitted from the annotation requester 122B, the cloud computing system 108 may use the timestamp data 710 to generate request data 712 that may be transmitted to the metadata store(s) 118 so that metadata 714 corresponding to the at least one timestamp can be retrieved. The request data 712 may be similar to the request data 612 of FIG. 6.

Upon receiving the request data 712 transmitted from the cloud computing system 108, the metadata store(s) 118 may retrieve the metadata 714 corresponding to the timestamp data 710. The metadata store(s) 118 may store the metadata indexed or otherwise associated with the at least one timestamp. The metadata store(s) 118 may further store the metadata indexed based on indications and/or other attributes of the metadata which may be indicated by a request from the client device(s) 102 for annotation. The retrieved metadata 714 may be transmitted by the metadata store(s) 118 to the cloud computing system 108.

Upon receiving the metadata 714 transmitted from the metadata store(s) 118, the cloud computing system 108 may transmit the metadata 716 and timestamp data 718 to a video annotator 120. The video annotator 120 may be located, for example, on an edge device 104 or a core device 106. The timestamp data 718 may correspond to the timestamp data 710. For example, the timestamp data 718 may indicate the at least one timestamp indicated by the timestamp data 710.

Upon receiving the timestamp data 718 from the cloud computing system 108, the video annotator 120 may generate request data 720 representative of one or more requests that may be transmitted to the video data store(s) 116 and/or the video manager(s) 112 so that the image data 722 corresponding to the timestamp data 718 can be retrieved.

Upon receiving the request data 720 from the video annotator 120, the video management system 150 can access the video data store(s) 116 to retrieve the image data 722 corresponding to the at least one timestamp indicated by the timestamp data 718. The video data store(s) 116 may store the image data 722 indexed or otherwise associated with the at least one timestamp. The retrieved image data 722 may be transmitted by the video management system 150 to the video annotator 120.

Having received the image data 722 and the metadata 716, the video annotator 120 can generate overlay data 726, which may be similar to the overlay data 622 of FIG. 6. The overlay data 726 may be transmitted by the video annotator 120 to the client device(s) 102 for presentation by the presentation manager 138.

Figure 8:
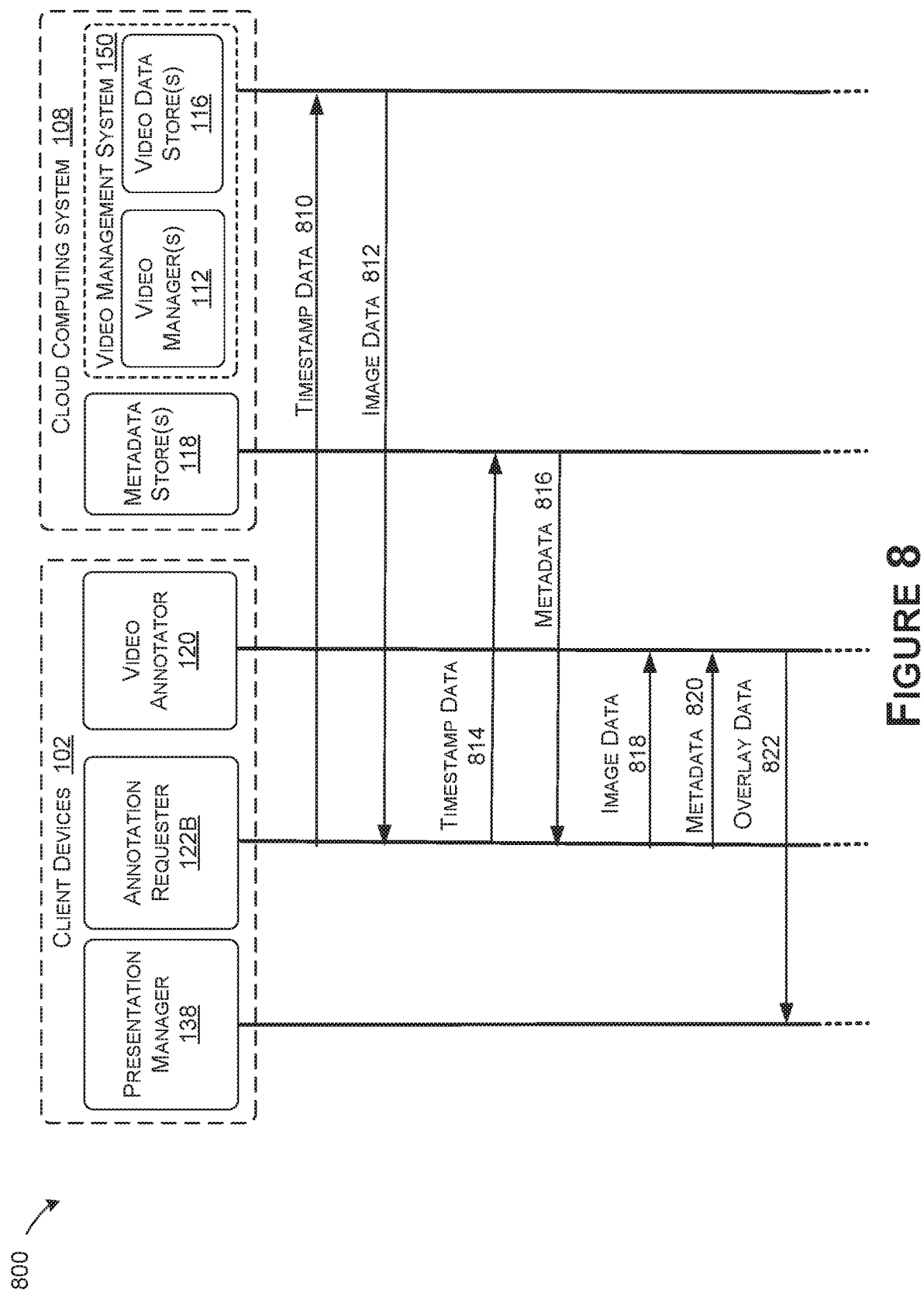
FIG. 8 is a flow diagram showing an example of communications involving a client device and a cloud computing system in which the client device retrieves metadata for overlaying on a video stream, in accordance with some embodiments of the present disclosure.

Now referring to FIG. 8. FIG. 8, is a flow diagram showing an example of communications involving a client device and a cloud computing system in which the client device retrieves metadata for overlaying on a video stream, in accordance with some embodiments of the present disclosure. It should be understood that this and other arrangements described herein are set forth only as examples. At a high level, communications 800 may involve the annotation requester 122B and the presentation manager 138 located on a client device(s) 102. The communications 800 may further involve the metadata store(s) 118, a video annotator(s) 120, and the cloud computing system 108 having the video management system 150, video manager 112, and video data store(s) 116A. While certain data is shown as being sent or received by the client device(s) 102 and the cloud computing system 108, this is not to imply that one or more of the other components shown cannot be included in the client device(s) 102 and/or the cloud computing system 108. In examples, any number of edge devices 104 and/or core devices 106 may be used to implement the communications 800 and additional communications between devices may be involved, which are not shown.

In some examples, the communications 800 may include transmitting timestamp data 810 between one or more devices. For example, the annotation requester 122B may transmit the timestamp data 810 to the cloud computing system 108. The timestamp data 810 may represent at least one timestamp, and may be used by video management system 150 of the cloud computing system 108 to retrieve corresponding image data 812 from the video data store(s) 116A of the cloud computing system 108. In various examples the timestamp data 810 may be similar to the timestamp data 710 of FIG. 7 (e.g., received in a request for annotation).

Upon receiving the timestamp data 810 transmitted from the annotation requester 122B, video management system 150 of the cloud computing system 108 may use the timestamp data 810 to retrieve the image data 812 from the video data store(s) 116 corresponding to the timestamp data 810. The video data store(s) 116A may be located on one or more of the edge device 104 and/or the core devices 106. For example, the timestamp data 810 may be received by a core device 106, and the image data 812 may be retrieved by a same or different core device 106 and/or an edge device(s) 104. The video data store(s) 116 may store the image data 812 indexed or otherwise associated with the at least one timestamp indicted by the timestamp data 810. The retrieved image data 812 may be transmitted by the video management system 150 to the annotation requester 122B.

In some examples, the annotation requester 122B may transmit timestamp data 814 representative of the at least one timestamp to the metadata store(s) 118 so that the metadata 816 corresponding to the at least one timestamp can be retrieved. The timestamp data 814 may further be provided with one or more criteria or attribute indicators that are used to identify or select the metadata 816 that is to be retrieved from the metadata store(s) 118. In embodiments where the metadata stores(s) 118 are located on the cloud computing system 108, the timestamp data 814 may not be transmitted to the metadata store(s) 118 as the timestamp data 810 may be sufficient. In examples where the metadata store(s) 118 includes the metadata store(s) 118C located on the client device 102, the transmission of the timestamp data 814 may be at least partially within the client device 102.

In further examples, the annotation requester 122B may transmit image data 818 to the video annotator 120. The annotation requester 122B may additionally transmit metadata 820 to the video annotator 120. The image data 818 may correspond to (e.g., comprise) the image data 812 and the metadata 820 may correspond to (e.g., comprise) the metadata 816. In embodiments where the video annotator 120 corresponds to the video annotator 120C of the client device(s) 102, the metadata 820 and the image data 818 may be transmitted at least partially within the client device(s) 102. In embodiments where the video annotator 120 is located on the cloud computing system 108, the timestamp data 820 and/or the image data 818 may not be transmitted to the video annotator 120 as the metadata 816 and the image data 812 may be sufficient.

Using the image data 818 and the metadata 820, the video annotator 120 can generate overlay data 822, which may be similar to the overlay data 726 of FIG. 7. The overlay data 822 may be transmitted by the video annotator 120 to the presentation manager 138 located on the client device(s) 102.

Figure 9:
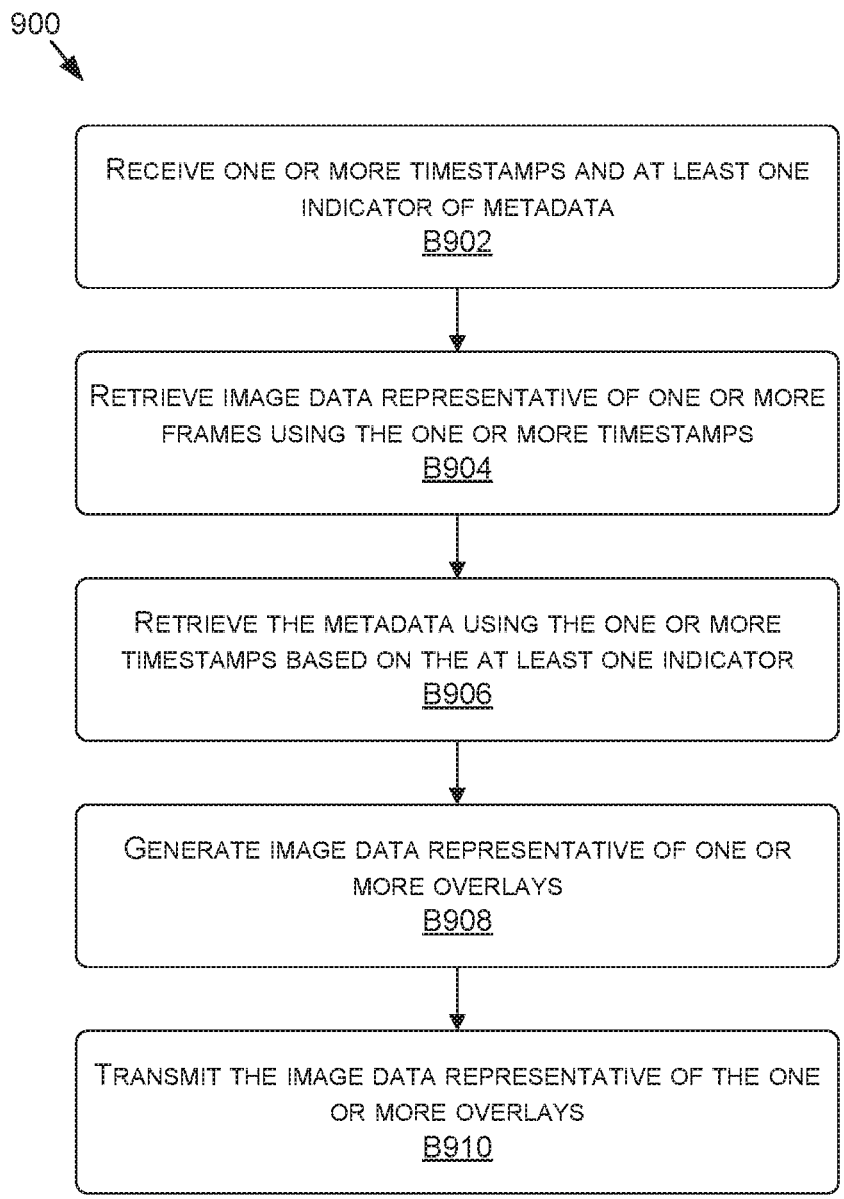
FIG. 9 is a flow diagram showing a method of generating a video overlay which an edge device may use to retrieve metadata and video data for generating an overlay of a video stream, in accordance with some embodiments of the present disclosure.

Now referring to FIG. 9, each block of method 900, and other methods described herein, comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. In addition, the method 900 is described, by way of example, with respect to the system of FIG. 1 and FIG. 6. However, this method may additionally or alternatively be executed by any one system, or any combination of systems, including, but not limited to, those described herein.

FIG. 9 is a flow diagram showing a method 900 for method of generating a video overlay which an edge device may use to retrieve metadata and video data for generating an overlay of a video stream, in accordance with some embodiments of the present disclosure. The method 900, at block B902, includes receiving one or more timestamps and at least one indicator of metadata. For example, the video annotator 120A may receive the timestamp data 610 indicative of one or more timestamps and may also receive an indicator of the metadata 616 from the annotation requester 122.

The method 900, at block B904, includes retrieving image data representative of one or more frames using the one or more timestamps. For example, the video annotator 120A may use the timestamp(s) to request the image data 618 that is representative of the one or more frames from one or more video data stores 116. The video data store(s) 116 may be executed and/or instantiated using one or more devices. For example, the video data store(s) 116 may be executed and/or instantiated using one or more edge device(s) 104, core devices 106, and/or client devices 102.

The method 900, at block B906, includes retrieving the metadata using the one or more timestamps based on the at least one indicator of the metadata. For example, the video annotator 120A requests the metadata 616 based on the one or more timestamps and the at least one indicator of the metadata 616, from the one or more metadata store(s) 118. The metadata store(s) 118 may be located on one or more devices. For example, the metadata store(s) 118 may be located on one or more edge device(s) 104, core device(s) 106, and/or client device(s) 102.

The method 900, at block B908, includes generating image data representative of one or more overlays. For example, the video annotator 120A may use the metadata 616 retrieved from the one or more metadata store(s) 118 and the image data 618 from the one or more video data store(s) 116 to generate the overlay data 622, which may comprise image data that is representative of an overlay.

The method 900, at block B910, includes transmitting the image data representative of the one or more overlays. For example, the video annotator 120A may transmit the overlay data 622 comprising the image data representative of the one or more overlays, to the client device(s) 102.

Figure 10:
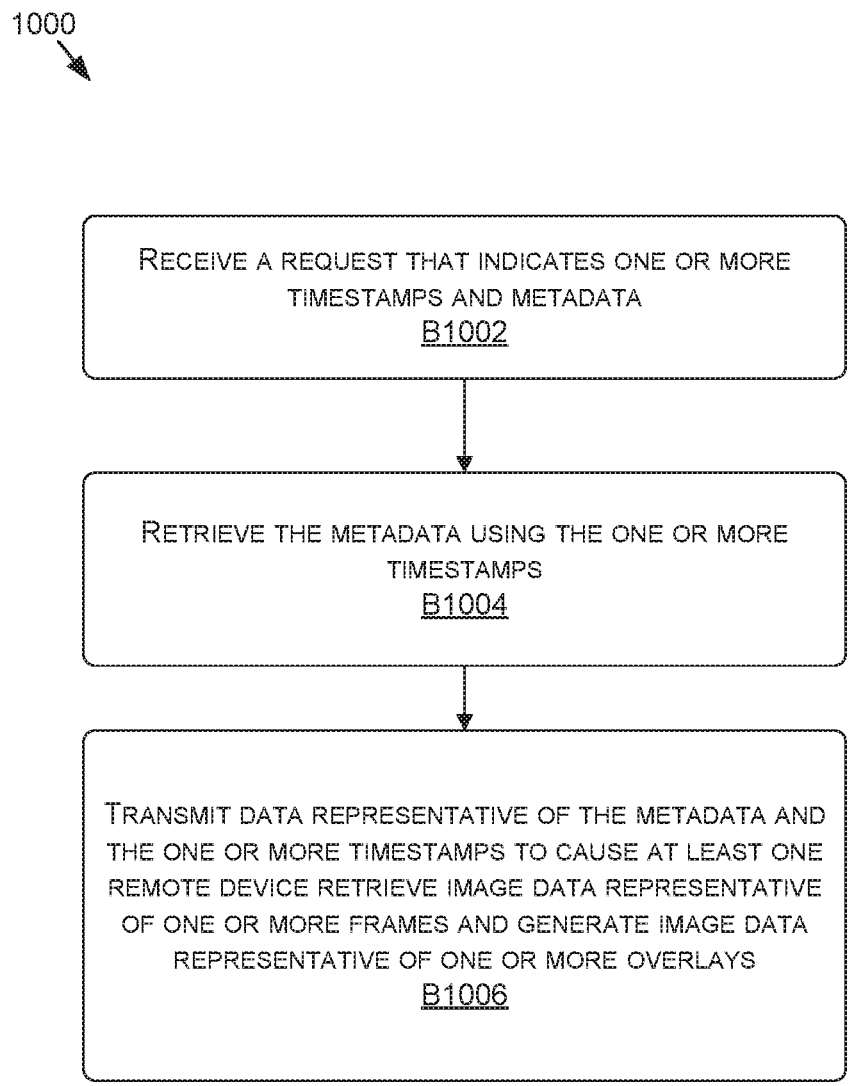
FIG. 10 is a flow diagram showing a method of generating a video overlay which a cloud computing system may use to retrieve and transmit metadata for generating an overlay of a video stream, in accordance with some embodiments of the present disclosure.

FIG. 10 is a flow diagram showing a method 1000 for generating a video overlay which a cloud computing system may use to retrieve and transmit metadata for generating an overlay of a video stream, in accordance with some embodiments of the present disclosure. The method 1000 is described, by way of example, with respect to the system of FIG. 1 and FIG. 7. However, this method may additionally or alternatively be executed by any one system, or any combination of systems, including, but not limited to, those described herein.

The method 1000, at block B1002, includes receiving a request that indicates one or more timestamps and metadata. For example, the cloud computing system 108 may receive the timestamp data 810, which may be included in a request from the annotation requester 122B. The request may include data representative of the one or more timestamps and an indicator of the metadata 816. In some examples, the annotation requester 122B may be located on a client device(s) 102 or may correspond to an annotation requester 122 located on one or more core devices 106 or edge devices 104 of the cloud computing system 108.

The method 1000, at block B1004, includes retrieving the metadata using the one or more timestamps. For example, the video annotator 120 may use the timestamp data 710 to request the metadata 714 from one or more metadata store(s) 118 using the request data 712. In some examples, the metadata store(s) 118 may be located on one or more devices. For example, the metadata store(s) 118 may be located on one or more edge devices 104, core devices 106, and/or client devices 102.

The method 1000, at block B1006, transmitting data representative of the metadata and the one or more timestamps to cause at least one remote device to retrieve image data representative of one or more frames and generate image data representative of one or more overlays. For example, the video annotator 120, which may be executed or instantiated using a component of the cloud computing system 108, may transmit the timestamp data 718 and the metadata 716 to the video annotator 120 causing the video annotator 120 to retrieve the image data 722 from one or more video data store(s) 116 and to generate the overlay data 726, which may comprise image data representative of one or more overlays. In some examples, the metadata store(s) 118 may be executed or instantiated using one or more devices. For example, the metadata store(s) 118 may be executed or instantiated using one or more edge devices 104, core devices 106, and/or client devices 102. Further, the video data store(s) 116 may be executed or instantiated using one or more devices. For example, the video data store(s) 116 may be executed or instantiated using one or more edge devices 104, core devices 106, and/or client devices 102.

Figure 11:
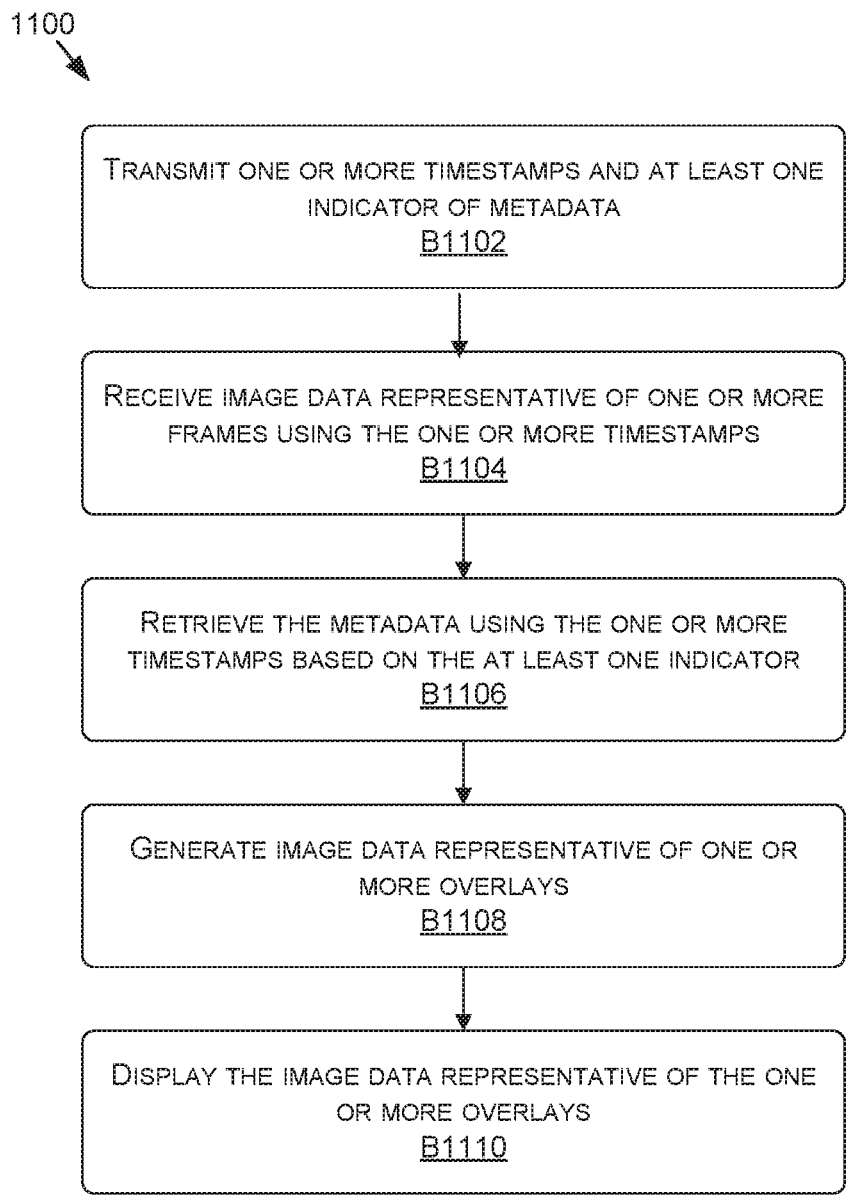
FIG. 11 is a flow diagram showing a method of generating a video overlay which a client device may use to retrieve metadata for generating an overlay of a video stream, in accordance with some embodiments of the present disclosure.

FIG. 11 is a flow diagram showing a method 1100 for generating a video overlay which a client device may use to retrieve metadata for generating an overlay of a video stream, in accordance with some embodiments of the present disclosure. The method 1100 is described, by way of example, with respect to the system of FIG. 1 and FIG. 8. However, this method may additionally or alternatively be executed by any one system, or any combination of systems, including, but not limited to, those described herein. The method 1100, at block B1102, includes transmitting one or more timestamps and at least on indicator of metadata. For example, the annotation requester 122B executed or instantiated using the client device(s) 102 may transmit a request that includes the timestamp data 810 and at least one indicator of the metadata 816 to the cloud computing system 108.

The method 1100, at block B1104, includes receiving image data representative of one or more frames using the one or more timestamps. For example, the annotation requester 122B executed or instantiated using the client device 102 may receive from one or more video data store(s) 116A of the cloud computing system 108, the image data 812 representative of the one or more frames of the video stream.

The method 1100, at block B1106, includes retrieving the metadata using the one or more timestamps based on the at least one indicator. For example, the annotation requester 122B executed or instantiated using the client device 102 may communicate a request comprising the timestamp data 814 to one or more metadata store(s) 118 to retrieve data representative of the metadata 816 of the one or more frames using the one or more timestamps.

The method 1100, at block B1108, includes generating image data representative of one or more overlays. For example, the video annotator 120 may generate the overlay data 822 using the image data 818 and the metadata 820, which may include image data representative of one or more overlays to the one or more frames of the video stream.

The method 1100, at block B1110, includes displaying the image data representative of the one or more overlays. For example, the presentation manager 138 executed or instantiated using the client device 102 may cause display of one or more frames with the one or more overlays using the overlay data 822.

Example Computing Device

Figure 12:
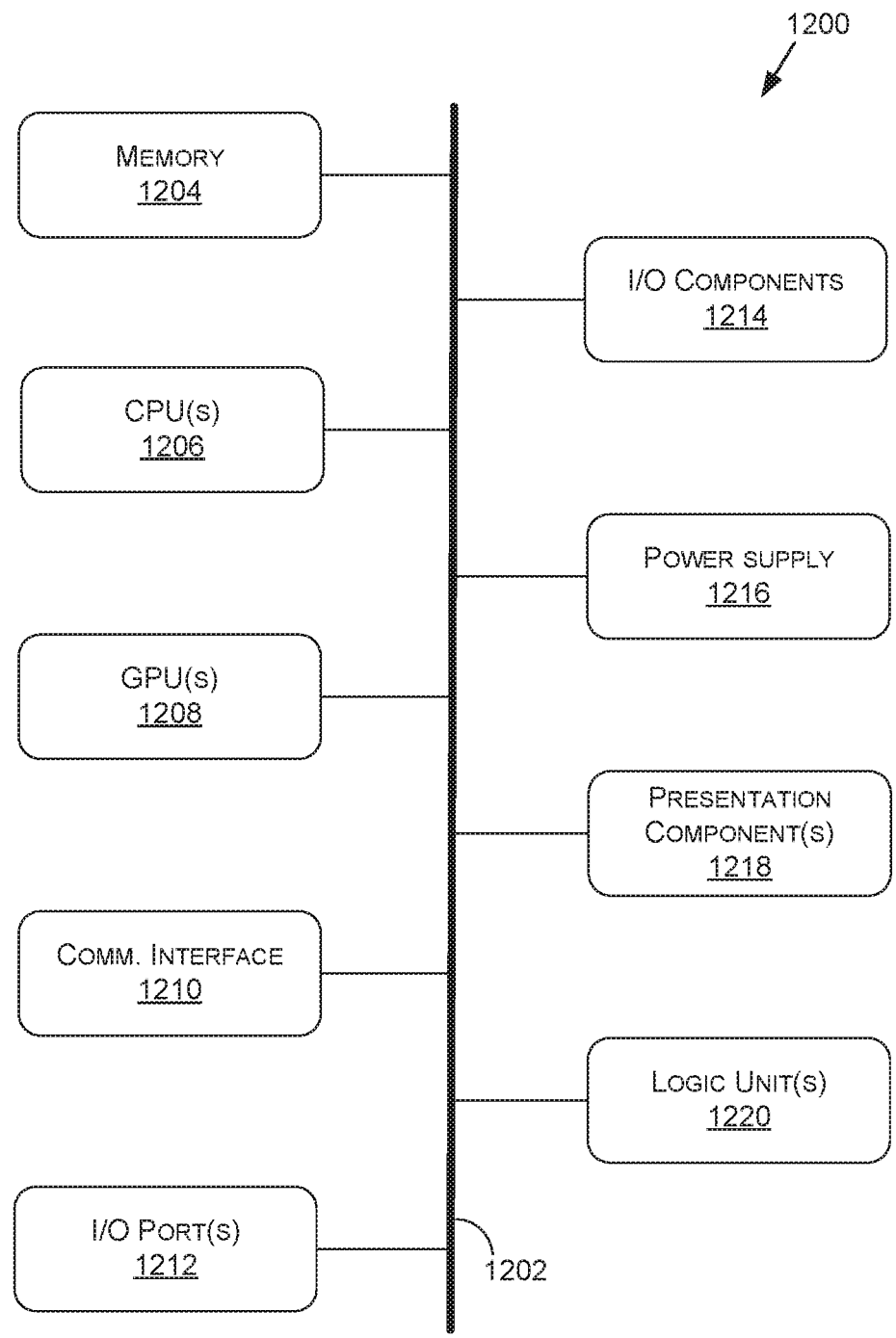
FIG. 12 is a block diagram of an example computing device suitable for use in implementing some embodiments of the present disclosure.

FIG. 12 is a block diagram of an example computing device(s) 1200 suitable for use in implementing some embodiments of the present disclosure. Computing device 1200 may include an interconnect system 1202 that directly or indirectly couples the following devices: memory 1204, one or more central processing units (CPUs) 1206, one or more graphics processing units (GPUs) 1208, a communication interface 1210, input/output (I/O) ports 1212, input/output components 1214, a power supply 1216, one or more presentation components 1218 (e.g., display(s)), and one or more logic units 1220.

In at least one embodiment, the computing device(s) 1200 may comprise one or more virtual machines, and/or any of the components thereof may comprise virtual components (e.g., virtual hardware components). For example, one or more of the GPUs 1208 may comprise one or more vGPUs, one or more of the CPUs 1206 may comprise one or more vCPUs, and/or one or more of the logic units 1220 may comprise one or more virtual logic units.

Although the various blocks of FIG. 12 are shown as connected via the interconnect system 1202 with lines, this is not intended to be limiting and is for clarity only. For example, in some embodiments, a presentation component 1218, such as a display device, may be considered an I/O component 1214 (e.g., if the display is a touch screen). As another example, the CPUs 1206 and/or GPUs 1208 may include memory (e.g., the memory 1204 may be representative of a storage device in addition to the memory of the GPUs 1208, the CPUs 1206, and/or other components). In other words, the computing device of FIG. 12 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 12.

The interconnect system 1202 may represent one or more links or busses, such as an address bus, a data bus, a control bus, or a combination thereof. The interconnect system 1202 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 1206 may be directly connected to the memory 1204. Further, the CPU 1206 may be directly connected to the GPU 1208. Where there is direct, or point-to-point connection between components, the interconnect system 1202 may include a PCIe link to carry out the connection. In these examples, a PCI bus need not be included in the computing device 1200.

The memory 1204 may include any of a variety of computer-readable media. The computer-readable media may be any available media that may be accessed by the computing device 1200. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 1204 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 1200. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 1206 may be configured to execute at least some of the computer-readable instructions to control one or more components of the computing device 1200 to perform one or more of the methods and/or processes described herein. The CPU(s) 1206 may each include one or more cores (e.g., one, two, four, eight, twenty-eight, seventy-two, etc.) that are capable of handling a multitude of software threads simultaneously. The CPU(s) 1206 may include any type of processor, and may include different types of processors depending on the type of computing device 1200 implemented (e.g., processors with fewer cores for mobile devices and processors with more cores for servers). For example, depending on the type of computing device 1200, the processor may be an Advanced RISC Machines (ARM) processor implemented using Reduced Instruction Set Computing (RISC) or an x86 processor implemented using Complex Instruction Set Computing (CISC). The computing device 1200 may include one or more CPUs 1206 in addition to one or more microprocessors or supplementary co-processors, such as math co-processors.

In addition to or alternatively from the CPU(s) 1206, the GPU(s) 1208 may be configured to execute at least some of the computer-readable instructions to control one or more components of the computing device 1200 to perform one or more of the methods and/or processes described herein. One or more of the GPU(s) 1208 may be an integrated GPU (e.g., with one or more of the CPU(s) 1206 and/or one or more of the GPU(s) 1208 may be a discrete GPU. In embodiments, one or more of the GPU(s) 1208 may be a coprocessor of one or more of the CPU(s) 1206. The GPU(s) 1208 may be used by the computing device 1200 to render graphics (e.g., 3D graphics) or perform general purpose computations. For example, the GPU(s) 1208 may be used for General-Purpose computing on GPUs (GPGPU). The GPU(s) 1208 may include hundreds or thousands of cores that are capable of handling hundreds or thousands of software threads simultaneously. The GPU(s) 1208 may generate pixel data for output images in response to rendering commands (e.g., rendering commands from the CPU(s) 1206 received via a host interface). The GPU(s) 1208 may include graphics memory, such as display memory, for storing pixel data or any other suitable data, such as GPGPU data. The display memory may be included as part of the memory 1204. The GPU(s) 1208 may include two or more GPUs operating in parallel (e.g., via a link). The link may directly connect the GPUs (e.g., using NVLINK) or may connect the GPUs through a switch (e.g., using NVSwitch). When combined together, each GPU 1208 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 1206 and/or the GPU(s) 1208, the logic unit(s) 1220 may be configured to execute at least some of the computer-readable instructions to control one or more components of the computing device 1200 to perform one or more of the methods and/or processes described herein. In embodiments, the CPU(s) 1206, the GPU(s) 1208, and/or the logic unit(s) 1220 may discretely or jointly perform any combination of the methods, processes and/or portions thereof. One or more of the logic units 1220 may be part of and/or integrated in one or more of the CPU(s) 1206 and/or the GPU(s) 1208 and/or one or more of the logic units 1220 may be discrete components or otherwise external to the CPU(s) 1206 and/or the GPU(s) 1208. In embodiments, one or more of the logic units 1220 may be a coprocessor of one or more of the CPU(s) 1206 and/or one or more of the GPU(s) 1208.

Examples of the logic unit(s) 1220 include one or more processing cores and/or components thereof, such as Tensor Cores (TCs), Tensor Processing Units(TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 1210 may include one or more receivers, transmitters, and/or transceivers that enable the computing device 1200 to communicate with other computing devices via an electronic communication network, included wired and/or wireless communications. The communication interface 1210 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The I/O ports 1212 may enable the computing device 1200 to be logically coupled to other devices including the I/O components 1214, the presentation component(s) 1218, and/or other components, some of which may be built in to (e.g., integrated in) the computing device 1200. Illustrative I/O components 1214 include a microphone, mouse, keyboard, joystick, game pad, game controller, satellite dish, scanner, printer, wireless device, etc. The I/O components 1214 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 1200. The computing device 1200 may be include depth cameras, such as stereoscopic camera systems, infrared camera systems, RGB camera systems, touchscreen technology, and combinations of these, for gesture detection and recognition. Additionally, the computing device 1200 may include accelerometers or gyroscopes (e.g., as part of an inertia measurement unit (IMU)) that enable detection of motion. In some examples, the output of the accelerometers or gyroscopes may be used by the computing device 1200 to render immersive augmented reality or virtual reality.

The power supply 1216 may include a hard-wired power supply, a battery power supply, or a combination thereof. The power supply 1216 may provide power to the computing device 1200 to enable the components of the computing device 1200 to operate.

The presentation component(s) 1218 may include a display (e.g., a monitor, a touch screen, a television screen, a heads-up-display (HUD), other display types, or a combination thereof), speakers, and/or other presentation components. The presentation component(s) 1218 may receive data from other components (e.g., the GPU(s) 1208, the CPU(s) 1206, etc.), and output the data (e.g., as an image, video, sound, etc.).

Example Data Center

Figure 13:
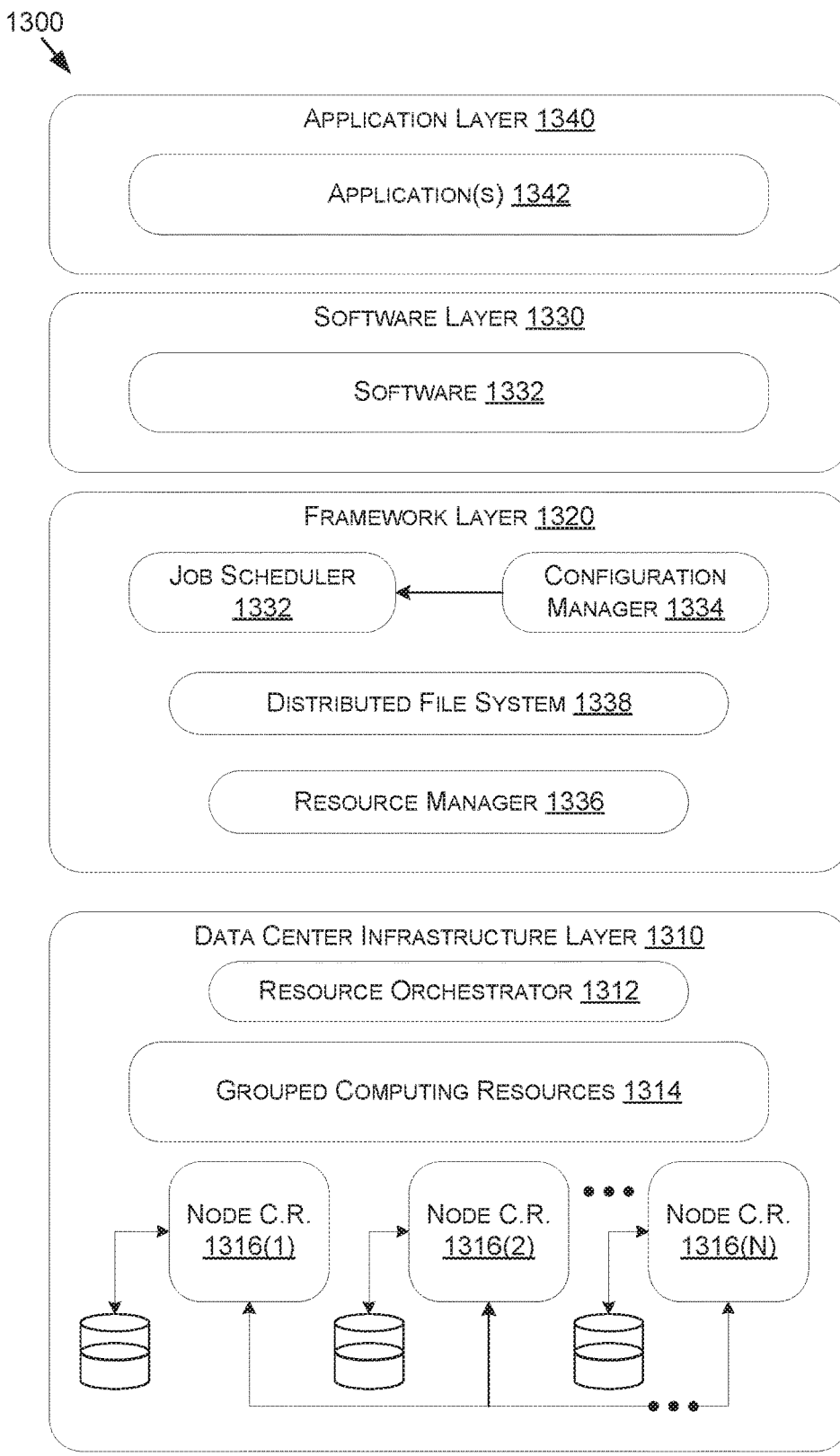
FIG. 13 is a block diagram of an example data center suitable for use in implementing some embodiments of the present disclosure.

FIG. 13 illustrates an example data center 1300, in which at least one embodiment may be used. In at least one embodiment, data center 1300 includes a data center infrastructure layer 1310, a framework layer 1320, a software layer 1330 and an application layer 1340.

In at least one embodiment, as shown in FIG. 13, data center infrastructure layer 1310 may include a resource orchestrator 1312, grouped computing resources 1314, and node computing resources ("node C.R.s") 1316(1)-1316(N), where "N" represents any whole, positive integer. In at least one embodiment, node C.R.s 1316(1)-1316(N) may include, but are not limited to, any number of central processing units ("CPUs") or other processors (including accelerators, field programmable gate arrays (FPGAs), graphics processors, etc.), memory devices (e.g., dynamic read-only memory), storage devices (e.g., solid state or disk drives), network input/output ("NW I/O") devices, network switches, virtual machines ("VMs"), power modules, and cooling modules, etc. In at least one embodiment, one or more node C.R.s from among node C.R.s 1316(1)-1316(N) may be a server having one or more of above-mentioned computing resources.

In at least one embodiment, grouped computing resources 1314 may include separate groupings of node C.R.s housed within one or more racks (not shown), or many racks housed in data centers at various geographical locations (also not shown). Separate groupings of node C.R.s within grouped computing resources 1314 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 1322 may configure or otherwise control one or more node C.R.s 1316(1)-1316(N) and/or grouped computing resources 1314. In at least one embodiment, resource orchestrator 1322 may include a software design infrastructure ("SDI") management entity for data center 1300. In at least one embodiment, resource orchestrator may include hardware, software or some combination thereof.

In at least one embodiment, as shown in FIG. 13, framework layer 1320 includes a job scheduler 1332, a configuration manager 1334, a resource manager 1336 and a distributed file system 1338. In at least one embodiment, framework layer 1320 may include a framework to support software 1332 of software layer 1330 and/or one or more application(s) 1342 of application layer 1340. In at least one embodiment, software 1332 or application(s) 1342 may respectively include web-based service software or applications, such as those provided by Amazon Web Services, Google Cloud and Microsoft Azure. In at least one embodiment, framework layer 1320 may be, but is not limited to, a type of free and open-source software web application framework such as Apache Spark™ (hereinafter "Spark") that may utilize distributed file system 1338 for large-scale data processing (e.g., "big data"). In at least one embodiment, job scheduler 1332 may include a Spark driver to facilitate scheduling of workloads supported by various layers of data center 1300. In at least one embodiment, configuration manager 1334 may be capable of configuring different layers such as software layer 1330 and framework layer 1320 including Spark and distributed file system 1338 for supporting large-scale data processing. In at least one embodiment, resource manager 1336 may be capable of managing clustered or grouped computing resources mapped to or allocated for support of distributed file system 1338 and job scheduler 1332. In at least one embodiment, clustered or grouped computing resources may include grouped computing resource 1314 at data center infrastructure layer 1310. In at least one embodiment, resource manager 1336 may coordinate with resource orchestrator 1312 to manage these mapped or allocated computing resources.

In at least one embodiment, software 1332 included in software layer 1330 may include software used by at least portions of node C.R.s 1316(1)-1316(N), grouped computing resources 1314, and/or distributed file system 1338 of framework layer 1320. One or more types of software may include, but are not limited to, Internet web page search software, e-mail virus scan software, database software, and streaming video content software.

In at least one embodiment, application(s) 1342 included in application layer 1340 may include one or more types of applications used by at least portions of node C.R.s 1316(1)-1316(N), grouped computing resources 1314, and/or distributed file system 1338 of framework layer 1320. One or more types of applications may include, but are not limited to, any number of a genomics application, a cognitive compute, and a machine learning application, including training or inferencing software, machine learning framework software (e.g., PyTorch, TensorFlow, Caffe, etc.) or other machine learning applications used in conjunction with one or more embodiments.

In at least one embodiment, any of configuration manager 1334, resource manager 1336, and resource orchestrator 1312 may implement any number and type of self-modifying actions based on any amount and type of data acquired in any technically feasible fashion. In at least one embodiment, self-modifying actions may relieve a data center operator of data center 1300 from making possibly bad configuration decisions and possibly avoiding underutilized and/or poor performing portions of a data center.

In at least one embodiment, data center 1300 may include tools, services, software or other resources to train one or more machine learning models or predict or infer information using one or more machine learning models according to one or more embodiments described herein. For example, in at least one embodiment, a machine learning model may be trained by calculating weight parameters according to a neural network architecture using software and computing resources described above with respect to data center 1300. In at least one embodiment, trained machine learning models corresponding to one or more neural networks may be used to infer or predict information using resources described above with respect to data center 1300 by using weight parameters calculated through one or more training techniques described herein.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A computer-implemented method comprising:
responsive to receiving one or more timestamps corresponding to one or more frames and metadata of a video stream, and at least one criteria of the metadata corresponding to a position of one or more identified objects depicted in the one or more frames:
retrieving, from a video data store on a first device, first image data representative of the one or more frames based at least on transmitting the one or more timestamps to the video data store, the first device using the one or more timestamps and a first index, generated at least in part by the first device, of the first image data indexed by the one or more timestamps to identify the first image data in the video data store;
retrieving, from a metadata store on a second device, metadata of the one or more frames corresponding to the least one criteria of the metadata based at least on transmitting the one or more timestamps to the metadata store, the second device using the one or more timestamps and a second index, generated at least in part by the second device, of the metadata and the one or more timestamps to identify the metadata in the metadata store; and
generating second image data representative of one or more overlays corresponding to the position of the one or more identified objects from the metadata retrieved from the metadata store and the first image data retrieved from the video data store.

2. The method of claim 1, wherein at least one edge device transmits the one or more timestamps to the video data store and to the metadata store to retrieve the first image data and the metadata, and wherein the at least one edge device generates the second image data representative of the one or more overlays using the first image data and the metadata.

3. The method of claim 1, wherein the receiving the one or more timestamps comprises receiving the one or more timestamps in a request sent from a client device and the retrieving of the metadata and the retrieving of the first image data is performed responsive to the request.

4. The method of claim 3, wherein the generating the second image data is performed using a third device that is different than the first device, the second device, and the client device.

5. The method of claim 1, where the retrieving the metadata is based at least on selecting the second device from a plurality of devices storing different portions of a plurality of metadata of the one or more frames using the at least one criteria.

6. The method of claim 1, wherein the first device uses a time synchronization system to determine the one or more timestamps associated with the first image data to generate the first index and the second device uses the time synchronization system to determine the one or more timestamps associated with the metadata to generate the second index.

7. The method of claim 1, wherein the first device generates the first index as the one or more frames are received by the first device, and the second device generates the second index as the one or more frames received and analyzed by the second device.

8. The method of claim 1, wherein the first device generates first data representing the one or more time stamps and generates the first index using the first data, and the second device generates second data representing the one or more time stamps and generates the second index using the second data.

9. The method of claim 1, wherein the first device is a first edge device of a cloud computing system and the second device is a second edge device of the cloud computing system, and the receiving of the one or more timestamps is by a core device of the cloud computing system.

10. A computer-implemented method comprising:
receiving, using a cloud computing system, a request from a client device that indicates one or more timestamps of one or more frames of a video stream and metadata corresponding to a position of one or more identified objects depicted in the one or more frames;
responsive to the request, retrieving from a metadata store on a first device, using the cloud computing system, the metadata of the one or more frames based at least on transmitting the one or more timestamps to the first device, the first device using the one or more timestamps and a first index, generated at least in part by the first device, of the metadata indexed by the one or more timestamps to identify the metadata in the metadata store; and
transmitting, using the cloud computing system, the metadata retrieved responsive to the request and the one or more timestamps to at least one remote device,. the transmitting causing the at least one remote device to perform operations that include:
retrieving, using the one or more timestamps, first image data from a video data store on a second device, the second device using the one or more timestamps and a second index, generated at least in part by the second device, of the first image data indexed by the one or more timestamps to identify the first image data in the video data store, and
generating second image data representative of one or more overlays corresponding to the position of the one or more identified objects using the metadata retrieved from the metadata store and the first image data retrieved from the video data store.

11. The method of claim 10, wherein the receiving of the request is executed using at least one core device of the cloud computing system, wherein the at least one remote device comprises at least one edge device of the cloud computing system.

12. The method of claim 10, wherein the transmitting the metadata retrieved responsive to the request and the one or more timestamps to the at least one remote device is executed using at least one edge device of the cloud computing system, wherein the at least one remote device comprises the client device.

13. The method of claim 10, wherein first device is a core device of the cloud computing system and the second device is an edge device of the cloud computing system.

14. The method of claim 10, wherein the at least one remote device is different than the client device and comprises a component of the cloud computing system, and the method further comprises transmitting the second image data, the transmitting causing display of the one or more frames with the one or more overlays using the client device.

15. A computer-implemented system comprising:
one or more processing devices to perform a method comprising:
transmitting a request to a cloud computing system, the request indicative of one or more timestamps of one or more frames of a video stream;
in response to the request, receiving first image data from a video data store on a first device of the cloud computing system, the first device using the one or more timestamps and a first index, generated at least in part by the first device, of the first image data indexed by the one or more timestamps to identify the first image data in the video data store;
retrieving, based at least on the one or more timestamps being transmitted to a metadata store, metadata from the metadata store on a second device, the metadata corresponding to a position of one or more identified objects depicted in the one or more frames, the second device using the one or more timestamps and a second index, generated at least in part by the second device, of the metadata and the one or more timestamps to identify the metadata in the metadata store; and
generating second image data representative of one or more overlays corresponding to the position of the one or more identified objects using the first image data received from the video data store and the metadata retrieved from the metadata store.

16. The method of claim 15, wherein the method is performed, at least in part, using one or more virtual machines.

17. The method of claim 15, wherein the method is performed by a client device.

18. The method of claim 15, wherein the request comprises at least one indicator of the metadata of the one or more frames.

19. The method of claim 15, wherein the request comprises a query received from a user interface of a client device and the query includes one or more times identifying the one or more timestamps.

20. The method of claim 15, wherein the metadata is representative of one or more of object location data, object classification data, or object segmentation data.

* * * * *